US012689522B2

(12) United States Patent
Doumar et al.

(10) Patent No.: US 12,689,522 B2
(45) Date of Patent: *Jul. 21, 2026

(54) SYSTEM AND METHODS FOR SECURE INTERACTIONS AND DIGITAL PETITION MANAGEMENT

(71) Applicant: TapText llc, Coral Springs, FL (US)

(72) Inventors: Steve Doumar, Fort Lauderdale, FL (US); David Teodosio, Guilford, CT (US)

(73) Assignee: TAPTEXT LLC, Coral Springs, FL (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/768,456

(22) Filed: Jul. 10, 2024

(65) Prior Publication Data

US 2025/0047501 A1 Feb. 6, 2025

Related U.S. Application Data

(63) Continuation of application No. 18/154,816, filed on Jan. 14, 2023, now Pat. No. 12,047,515, which is a
(Continued)

(51) Int. Cl.
H04L 9/32 (2006.01)
H04L 9/00 (2022.01)
H04W 4/14 (2009.01)

(52) U.S. Cl.
CPC ............. H04L 9/3247 (2013.01); H04L 9/50 (2022.05); H04W 4/14 (2013.01)

(58) Field of Classification Search
None
See application file for complete search history.

(56) References Cited

U.S. PATENT DOCUMENTS

| | | |
|---|---|---|
| 11,062,038 B2 | 7/2021 | Murphy et al. |
| 2017/0214522 A1 | 7/2017 | Code et al. |

(Continued)

OTHER PUBLICATIONS

Balakrishnan, M., Mohomed, I. and Ramasubramanian, V., Nov. 2009. Where's that phone? Geolocating IP addresses on 3G networks. In Proceedings of the 9th ACM SIGCOMM conference on Internet measurement (pp. 294-300). (Year: 2009).*

(Continued)

*Primary Examiner* — Luu T Pham
*Assistant Examiner* — Edward X Long
(74) *Attorney, Agent, or Firm* — GALVIN PATENT LAW LLC; Brian R. Galvin

(57) ABSTRACT

A system and method for digital petition management utilizing the establishment of a universal, secure identity for online communications, interactions, and exchanges that uniquely associates an image, sound, or other digital asset with a person's identity using non-fungible tokens (NFTs). A digital signature associated with an individual who wants to sign a digital petition is obtained and verified using one or more mechanisms to ensure that each digital signature is associated with only one individual and to maintain compliance with rules and regulations governing petitions. Links to the petition (also herein called "calls to action" or CTAs) can be customized via an online platform such that interaction with a given link or type of link initiates automated petition signature acquisition. In some implementations, the digital signature is a personal NFT (PNFT) which can be verified using a unique identifier to match with existing PNFTs stored in a distributed ledger.

20 Claims, 23 Drawing Sheets

Related U.S. Application Data continuation-in-part of application No. 17/942,227, filed on Sep. 12, 2022, now Pat. No. 12,158,938.

(60) Provisional application No. 63/399,631, filed on Aug. 19, 2022, provisional application No. 63/319,314, filed on Mar. 12, 2022.

(56) References Cited

U.S. PATENT DOCUMENTS

| | | | |
|---|---|---|---|
| 2018/0060914 | A1 | 3/2018 | Conrad et al. |
| 2020/0169415 | A1* | 5/2020 | Schmidt ................ H04L 9/3247 |
| 2020/0186338 | A1 | 6/2020 | Andon et al. |
| 2020/0242105 | A1 | 7/2020 | Rich et al. |
| 2021/0243027 | A1 | 8/2021 | Gupta |
| 2021/0306460 | A1 | 9/2021 | Doumar et al. |
| 2021/0351937 | A1* | 11/2021 | Thacker .................. G06F 16/27 |
| 2021/0398095 | A1 | 12/2021 | Mallett et al. |
| 2022/0366762 | A1* | 11/2022 | Nelson ................ G07F 17/3244 |

OTHER PUBLICATIONS

Kristiawan, A.S., Sanjaya, R. and Prasetya, F.X., 2022. Development of Blockchain-Based Digital Signature Platform. journal of busines and technology, 2(3), pp. 108-118. (Year: 2022).*

Dold, F., 2019. The GNU Taler system: practical and provably secure electronic payments (Doctoral dissertation, Université de Rennes). (Year: 2019).*

Wang et al. Non-fungible token (NFT): Overview, evaluation, opportunities and challenges. arXiv preprint arXiv:2105.07447.Oct. 25, 2021. [retrieved on Jul. 3, 2023] Retrieved from the Internet < URL: https://arxiv.org/pdf/2105.07447.pdf> entire document.

* cited by examiner

Setup and Adminstration of Ad Campaigns and PNFTs

Operation of Ad Campaigns

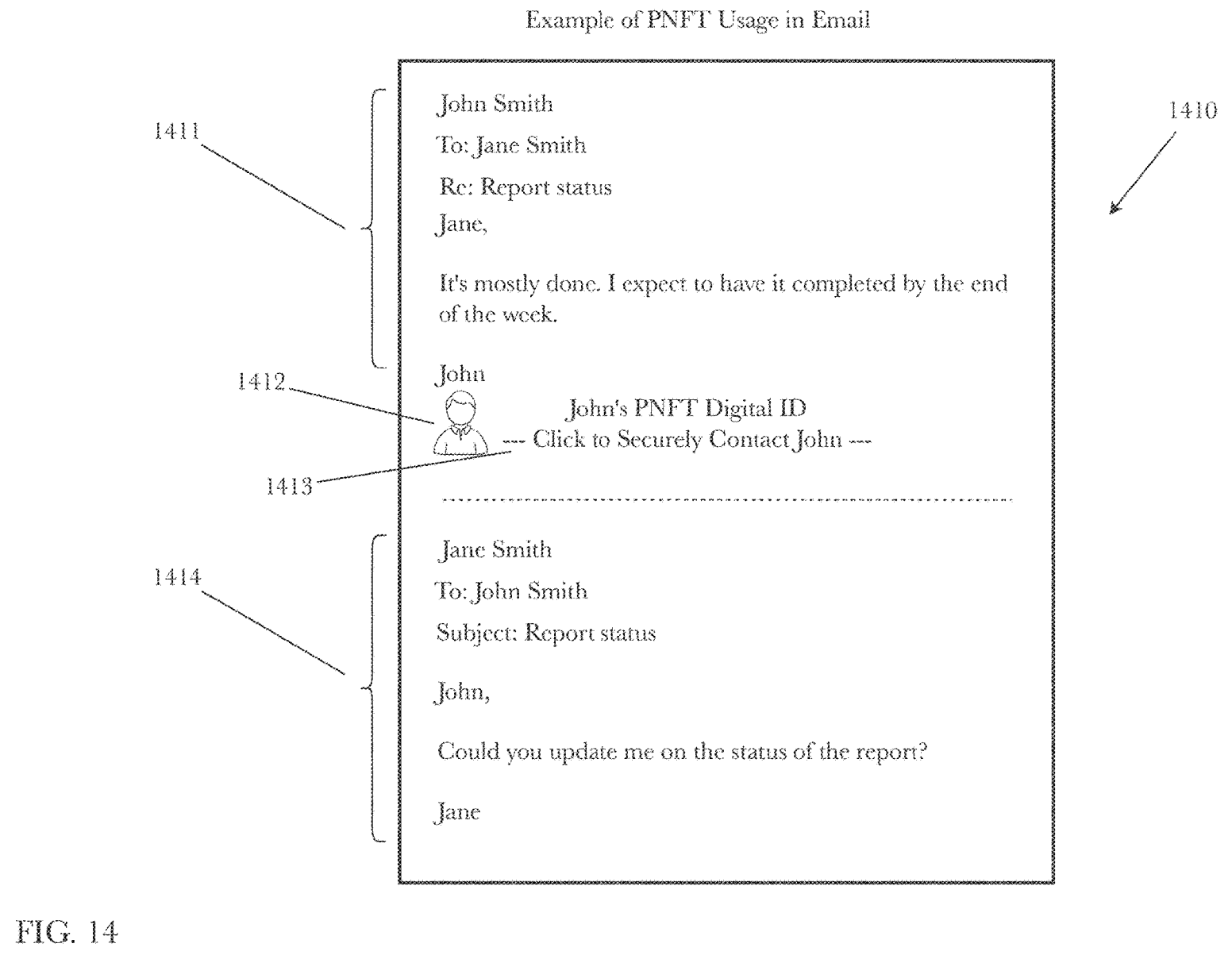

Example of PNFT Usage in Email

1411

John Smith

To: Jane Smith

Re: Report status

Jane,

It's mostly done. I expect to have it completed by the end of the week.

John

1412

John's PNFT Digital ID

1413

--- Click to Securely Contact John ---

1414

Jane Smith

To: John Smith

Subject: Report status

John,

Could you update me on the status of the report?

Jane

FIG. 14

Figure 15:
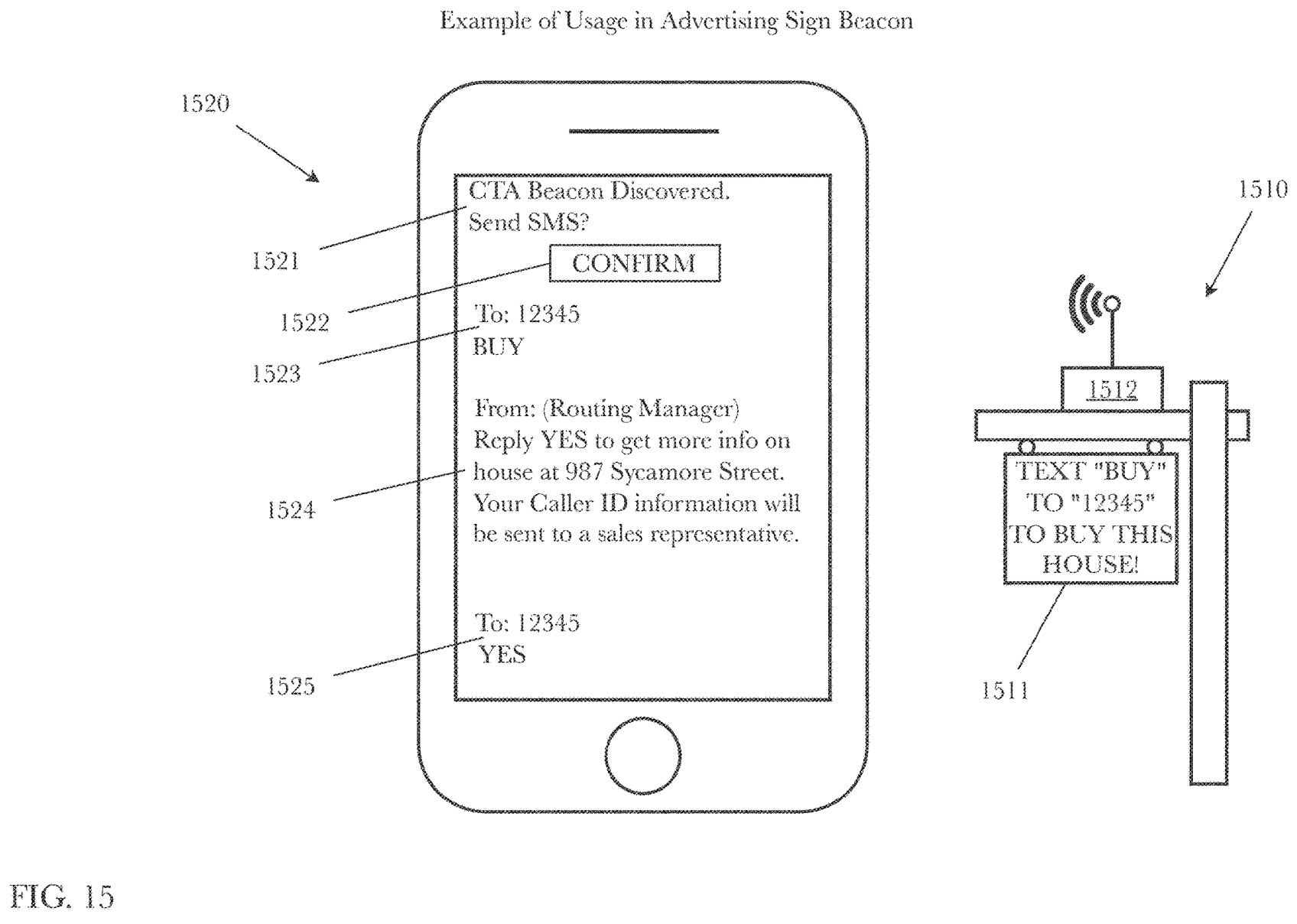

Example of Usage in Advertising Sign Beacon

1510

1512

"TEXT "BUY"
TO "12345"
TO BUY THIS
HOUSE!

1511

1520

CTA Beacon Discovered.
Send SMS?

CONFIRM

1521

1522

To: 12345
BUY

1523

From: (Routing Manager)
Reply YES to get more info on
house at 987 Sycamore Street.
Your Caller ID information will
be sent to a sales representative.

1524

To: 12345
YES

Operation of Petition Campaigns

FIG. 18

SYSTEM AND METHODS FOR SECURE INTERACTIONS AND DIGITAL PETITION MANAGEMENT

CROSS-REFERENCE TO RELATED APPLICATIONS

Priority is claimed in the application data sheet to the following patents or patent applications, each of which is expressly incorporated herein by reference in its entirety:
Ser. No. 18/154,816
Ser. No. 17/942,227
63/319,314
63/399,631

BACKGROUND OF THE INVENTION

Field of the Art

The disclosure relates to the field of computer-based communication systems, and more particularly to the field of using non-fungible tokens (NFTs) as secure personal identifiers for communications, interactions, and exchanges.

Discussion of the State of the Art

While there are various means for insuring secure online communications and means for confirming identities in online interactions, none of the existing options have a means for uniquely associating an image, sound, or other digital asset with a person's identity so as to create a universal, secure identity for online communications and interactions wherein others, when viewing and interacting with that digital asset online, can be certain that they are communicating and interacting with the person with whom they intend to interact. Further, none of the existing options allow for customization of links to that universal, secure identity such that each link or type of link can be configured to initiate automated actions as desired by the owner of the identity.

The ability to prove an individual's identity using a digital representation or digital signature such as, for example, a non-fungible token, can provide benefit to civil discourse and governmental petitioning. A petition generally requires a specified amount of signatures from real citizens as well as personal information such as an address, email, and voting status (i.e., registered or not registered to vote). Most petitions must be manually verified to ensure that each signature corresponds to one person and that the people who sign are located in the an area associated with the petition (e.g., a county or state resident, etc.). This is a time consuming, but important step in providing a useful and legal petition in order to progress the cause associated with the petition.

What is needed is a system and method for digital petition management which provides an interface for the creation and deployment of a digital petition, which monitors and analyzes data associated with the digital petition in order to adjust and optimize the distribution and layout of said digital petition, and which verifies each digital signature on the petition and validates the petition before sending the petition to the appropriate endpoint.

SUMMARY OF THE INVENTION

Accordingly, the inventor has conceived, and reduced to practice, a system and method for digital petition management utilizing the establishment of a universal, secure identity for online communications, interactions, and exchanges that uniquely associates an image, sound, or other digital asset with a person's identity using non-fungible tokens (NFTs). A digital signature associated with an individual who wants to sign a digital petition is obtained and verified using one or more mechanisms to ensure that each digital signature is associated with only one individual and to maintain compliance with rules and regulations governing petitions. Links to the petition (also herein called "calls to action" or CTAs) can be customized via an online platform such that interaction with a given link or type of link initiates automated petition signature acquisition. In some implementations, the digital signature is a personal NFT (PNFT) which can be verified using a unique identifier to match with existing PNFTs stored in a distributed ledger. Further, the online platform can be configured to automatically place the customized links to the petition in locations which will facilitate communications and interactions with the creator of the petition such as on websites, in communications such as emails and short message service (SMS) communications, and in advertisements and marketing messages.

According to a preferred embodiment, A system for secure interactions for digital petition management is disclosed, comprising: a computing device comprising a memory, a processor, and a non-volatile data storage device; a positioning server comprising a first plurality of programming instructions stored in the memory which, when operating on the processor, causes the computing device to: place a call to action associated with a digital petition on an Internet website or embed the call to action in a message communication, the call to action comprising a clickable link or button, the clickable link or button further comprising coding instructions configured to generate, when clicked, a pre-filled first short message service (SMS) or multi-media message service (MMS) message on a mobile device, the SMS or MMS message comprising an identifier for the call to action; and a media server comprising a second plurality of programming instructions stored in the memory which, when operating on the processor, causes the computing device to: receive the first SMS or MMS message from the mobile device; capture the phone number of the mobile computing device from the first SMS or MMS message; send a second SMS or MMS message to the mobile computing device requesting a digital signature; receive a third SMS or MMS message from the mobile computing device comprising the digital signature and metadata; send the digital signature and metadata to a petition manager; and a petition manager comprising a third plurality of programming instructions stored in the memory which, when operating on the processor, causes the computing device to: receive the phone number of the mobile computing device, the digital signature, and the metadata; use the metadata to create a timestamp indicating the time the digital signature was received; verify, using the phone number, that the individual associated with the digital signature matches the same phone number stored on a customer database; and store the verified digital signature and the metadata in a distributed ledger.

According to another preferred embodiment, a method for secure interactions for digital petition management is disclosed, comprising the steps of: placing a call to action associated with a digital petition on an Internet website or embed the call to action in a message communication, the call to action comprising a clickable link or button, the clickable link or button further comprising coding instructions configured to generate, when clicked, a pre-filled first short message service (SMS) or multi-media message service (MMS) message on a mobile device, the SMS or MMS message comprising an identifier for the call to action; and receiving the first SMS or MMS message from the mobile device; capturing the phone number of the mobile computing device from the first SMS or MMS message; sending a second SMS or MMS message to the mobile computing device requesting a digital signature; receiving a third SMS or MMS message from the mobile computing device comprising the digital signature and metadata; sending the digital signature and metadata to a petition manager; and receiving the phone number of the mobile computing device, the digital signature, and the metadata; using the metadata to create a timestamp indicating the time the digital signature was received; verifying, using the phone number, that the individual associated with the digital signature matches the same phone number stored on a customer database; and storing the verified digital signature and the metadata in a distributed ledger.

According to an aspect of an embodiment, the digital signature comprises a private key associated with the user of the mobile device and wherein the digital signature is verified using a corresponding public key stored on the customer database.

According to an aspect of an embodiment, a personal non-fungible token (PNFT) database stored on the non-volatile data storage device, the PNFT database comprising identifiers for one or more personal non-fungible tokens (PNFTs) recorded on a blockchain database.

According to an aspect of an embodiment, the digital signature comprises a PNFT identifier associated with the user of the mobile device, and wherein the petition manager is further configured to: receive the digital signature comprising the PNFT identifier; and verify, using the PNFT identifier, that the PNFT token associated with the PNFT identifier matches the same PNFT token stored on the blockchain database.

According to an aspect of an embodiment, the distributed ledger is a blockchain ledger.

According to an aspect of an embodiment, the metadata comprises at least geolocation information and time and date information.

According to an aspect of an embodiment, the digital petition is a petition for a local, state, or federal use case According to an aspect of an embodiment, the petition manager is further configured to send a completed digital petition to specified endpoint.

BRIEF DESCRIPTION OF THE DRAWINGS

The accompanying drawings illustrate several aspects and, together with the description, serve to explain the principles of the disclosed embodiments. It will be appreciated by one skilled in the art that the particular arrangements illustrated in the drawings are merely exemplary, and are not to be considered as limiting of the scope of the claims herein in any way.

FIG. 10 is a messaging diagram showing exemplary messaging for operation of the system for ad campaigns.

FIG. 14 shows an example of PNFT usage in emails.

FIG. 15 shows an example of usage of CTAs in advertising sign beacons.

FIG. 18 is a messaging diagram showing exemplary messaging for operation of the system for petition campaigns.

DETAILED DESCRIPTION OF THE INVENTION

Figure 1:
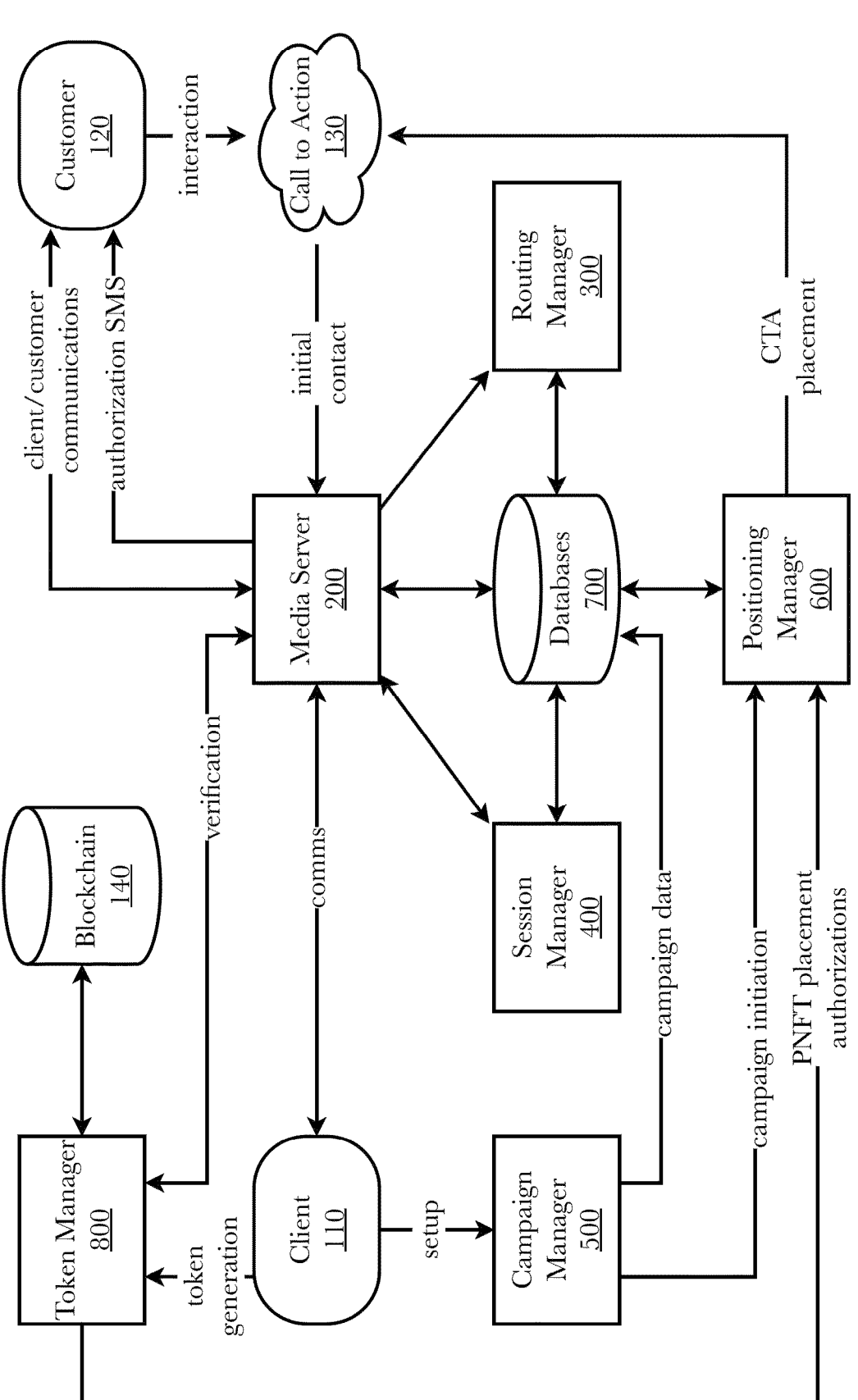
FIG. 1 is an exemplary system architecture for a communications and interaction system using SMS-based authorizations and personal non-fungible tokens.

The inventor has conceived and reduced to practiced, a system and method for digital petition management utilizing the establishment of a universal, secure identity for online communications, interactions, and exchanges that uniquely associates an image, sound, or other digital asset with a person's identity using non-fungible tokens (NFTs). A digital signature associated with an individual who wants to sign a digital petition is obtained and verified using one or more mechanisms to ensure that each digital signature is associated with only one individual and to maintain compliance with rules and regulations governing petitions. Links to the petition (also herein called "calls to action" or CTAs) can be customized via an online platform such that interaction with a given link or type of link initiates automated petition signature acquisition. In some implementations, the digital signature is a personal NFT (PNFT) which can be verified using a unique identifier to match with existing PNFTs stored in a distributed ledger. Further, the online platform can be configured to automatically place the customized links to the petition in locations which will facilitate communications and interactions with the creator of the petition such as on websites, in communications such as emails and short message service (SMS) communications, and in advertisements and marketing messages.

The system may be configured to further facilitate interactions by utilizing a short message service (SMS) authorization methodology wherein interaction with a CTA on a smartphone initiates a series of SMS messages back and forth to a server which authorizes communications between the user of a smartphone and a third party associated with the CTA. When a user interacts with the CTA on his or her smartphone, the CTA causes the smartphone to generate a first SMS on the smartphone which has been pre-filled with an SMS address code and a CTA identifier. When the first SMS is sent from the smartphone, the server at the address code receives the first SMS, captures the CTA identifier and phone number of the smartphone, and sends a second SMS back to the smartphone with a link and a request for authorization to send the phone number to a third party for communications. Clicking on the link in the second SMS sends a third SMS back to the server at the address code authorizing the transmission of the phone number to a third party. In this way, authorization for capture of the user's phone number and establishment of communications with a third party can be established simply by having the user click on two automatically-generated SMS messages without having to otherwise enter any data on the smartphone. This method works universally on all smartphones with SMS technology without having to install additional applications. Note that while SMS technology is the primary example used herein, the invention is not so limited and other forms of mobile device interactions may be used, provided that an identifier for the mobile device can be obtained from the interaction (e.g., multi-media message service (MMS) messages, email addresses from email headers, caller ID from phone calls, caller ID from VOIP calls, etc.).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in said arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is an exemplary system architecture for a communications and interaction system using SMS-based authorizations and personal non-fungible tokens. This diagram restates and clarifies the previous system architecture diagrams of FIGS. 1A, 1B, and 53 of the parent application (U.S. Ser. No. 17/942,227) and prior applications that have been incorporated herein by reference. In this exemplary embodiment, the system comprises a media server 200, a routing manager 300, a session manager 400, a campaign manager 500, a positioning manager 600, databases 700, and a token manager 800. The system facilitates communications and interactions between clients 110 and customers 120 using calls to action 130. A client 110 is any person or entity (e.g., a business entity) wishing to engage in communications or interactions and who has established a marketing campaign or established a personal non-fungible token (PNFT) for that purpose. A customer 120 is any person or entity (e.g., a business entity) wishing to engage in communications or interactions with a client 110. Communications and interactions between clients 110 and customers 120 are initiated by a customer's interaction with a call to action (CTA) 130. The CTA 130 is any means for contacting a client 110 through the system comprising a way to identify the CTA 130 and the client with which it is associated. For online and other digital CTAs (websites, emails, in-app advertisements, etc.), the CTA 130 will generally be generated and placed by the system in accordance with a client's 110 marketing campaign rules or PNFT rules. However, non-electronic CTAs are also possible such as printed CTAs in print advertising, signage, or in-store displays.

The media server 200 acts as the communication channel interface between client and customer devices, passing various forms of communications media (emails, texts, traditional telephone, VOIP, etc.) between the devices. The routing manager 300 selects an appropriate routing for incoming and outgoing communications based on information from the session manager. The session manager 400 creates and manages each communication session between a client and customer by creating a session initiation protocol (SIP) communication sessions for each communication between a client and customer using the CTA identifier, the customer's contact information, and information about the communications medium being used. The session manager 400 monitors and logs the session, and terminates the session when the communication ends. The campaign manager 500 provides the client with an interface through which the client may create automated advertising campaigns which may be dynamically adjusted based on feedback from customer interactions with CTAs and other information. The positioning manager 600 creates campaign instances from a campaign, and automatically determines where and when to place CTAs for each campaign instance depending on scheduling, targeting, and budgeting goals. The databases 700 store campaign information, client information, and customer information. The token manager 800 provides an interface for design and generation of PNFTs, establishment of automation rules for interactions with PNFTS, and verification of identities using PNFTs.

Figure 2:
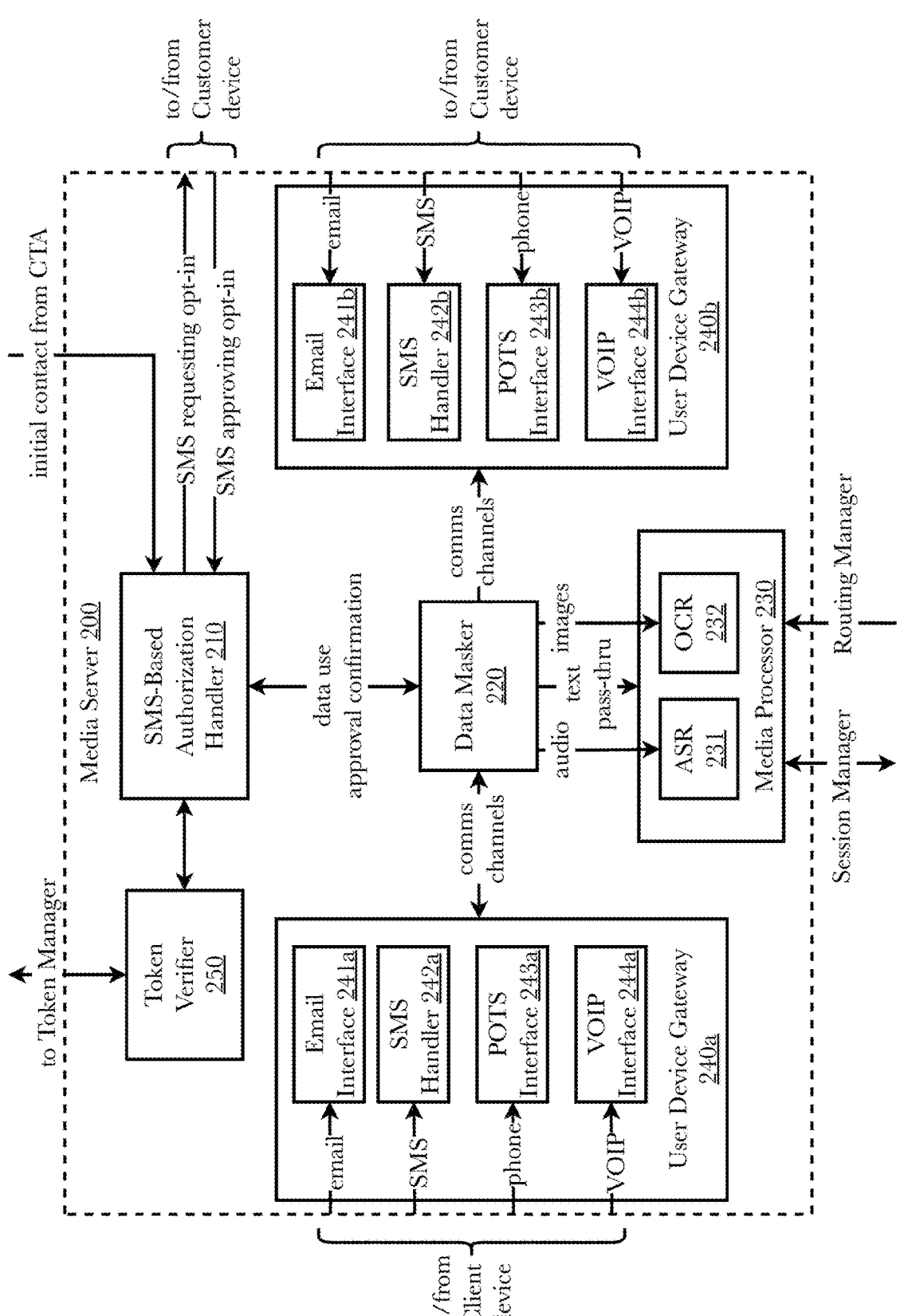
FIG. 2 is an exemplary media server aspect of a communications and interaction system using SMS-based authorizations and personal non-fungible tokens.

FIG. 2 is an exemplary media server aspect of a communications and interaction system using SMS-based authorizations and personal non-fungible tokens. This diagram restates and clarifies the previous system architecture diagram of FIG. 44 of the parent application (U.S. Ser. No. 17/942,227) and prior applications that have been incorporated herein by reference. The media server 200 acts as the communication channel interface between client and customer devices, passing various forms of communications media (emails, texts, traditional telephone, VOIP, etc.) between the devices. In this embodiment, the media server comprises an SMS-based authorization handler 210, a data masker 220, a media processor 230, user device gateways 240a,b, on both the client and customer sides, and a token verifier 250.

In this embodiment, an SMS-based authorization handler 210 is shown as part of the media server 200. The SMS-based authorization handler 210 handles the data use authorization (also called an "opt-in") process via text messages. Using the SMS-based authorization handler 210, the system is configured to facilitate interactions by utilizing a short message service (SMS) authorization methodology wherein interaction with a CTA on a smartphone initiates a series of SMS messages back and forth to the media server 200 which authorizes communications between the user of a smartphone (a customer) and a third party associated with the CTA (a client). When the customer interacts with the CTA on his or her smartphone, the CTA accesses the smartphone's text messaging application and causes the smartphone to generate a first SMS on the smartphone which has been pre-filled with an SMS address code for the SMS-based authorization handler 210 of the media server 200 and a CTA identifier. When the first SMS is sent from the smartphone, the SMS-based authorization handler 210 of the media server 200 receives the first SMS, captures the CTA identifier and phone number of the smartphone, and sends a second SMS back to the smartphone containing a link and a request for authorization to send the phone number to a third party for communications (e.g., "To authorize Company X to call you back on phone number Y to purchase product Z, click here."). Clicking on the link in the second SMS sends a third SMS back to the SMS-based authorization handler 210 of the media server 200 authorizing the transmission of the phone number to a client so that the client may contact the customer. In this way, authorization for capture of the customer's phone number and establishment of communications with a client can be established simply by having the customer click on two automatically-generated SMS messages without having to otherwise enter any data on the smartphone. This method works universally on all smartphones with SMS technology without having to install additional applications. The data use approval confirmation received by the customer is logged and passed to other components of the system (e.g., to the session manager via the data masker) to confirm authorization to use private information. Note that while SMS technology is the primary example used herein, the invention is not so limited and other forms of mobile device interactions may be used, provided that an identifier for the mobile device can be obtained from the interaction (e.g., multi-media message service (MMS) messages, email addresses from email headers, caller ID from phone calls, caller ID from VOIP calls, etc.).

A data masker 220 operating on the media server 200 preserves the privacy of both client and customer by masking the phone number, email addresses, and other identifying information of the parties until they voluntarily exchange confidential information between themselves via the communications medium. As the data masker 220 is privy to the private information of the parties, it can establish a connection with each party separately using the private information, and they join the parties together via a real-time communications medium (e.g., phone) without having to pass the private information to each of the parties or can forward non-real-time communications between the parties (e.g., emails) while stripping identifying information from the transmitted messages (e.g., from the email headers).

The media processor 230 converts audio and image communications media to text, and passes through text communications to the session manager 400. For example, where the interaction with the CTA is in audio form (e.g., a call to a phone number printed on the CTA), the audio from the interaction may be sent to an automated speech recognition (ASR) processor 231 (also known as a speech-to-text (STT) processor) to convert the speech from the audio into text. Where the interaction with the CTA is a transmitted image (e.g., a photo of the CTA sent by MMS), the image from the interaction may be sent to an optical character recognition (OCR) processor 232 to extract any text in the image (e.g., the CTA identifier). The converted text is then sent to the NLP engine to be processed as with the interactions in text form. Any text interactions with the CTA (e.g., text messages), are passed through to the session manager 400.

User device gateways 240a, 240b on both the client side and customer side both comprise a plurality of interfaces 241A-244a, 241B-244b receive and transmit communications to and from client and customer devices. For simplicity and clarity, a single user device gateway is shown on the client end 240a and on the customer end 240b, each comprising an email interface 241A,b, a short message service (SMS) handler 242a,b, a plain old telephone (POTS, or traditional telephone line) interface 243a,b, and a voice-over-Internet-protocol (VOIP) interface 244a,b. While these are the most common media interfaces, the user device gateways 240a,b may have other such communications media interfaces and there may be a plurality of user device gateways 240a,b on either side.

Figure 3:
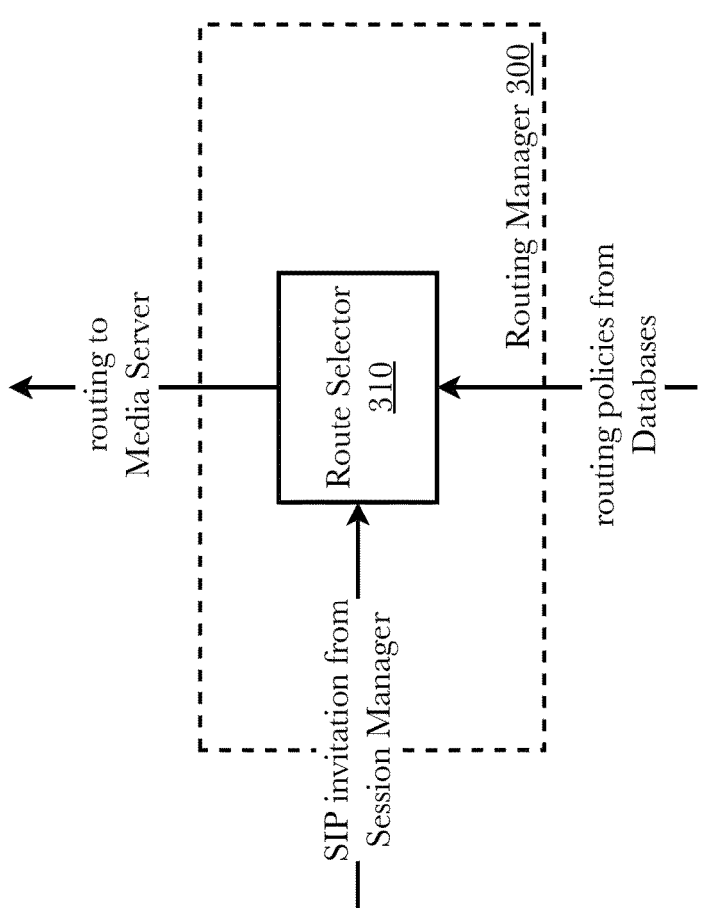
FIG. 3 is an exemplary routing manager aspect of a communications and interaction system using SMS-based authorizations and personal non-fungible tokens.

FIG. 3 is an exemplary routing manager aspect of a communications and interaction system using SMS-based authorizations and personal non-fungible tokens. This diagram restates and clarifies the previous system architecture diagram of FIG. 43 of the parent application (U.S. Ser. No. 17/942,227) and prior applications that have been incorporated herein by reference. In this embodiment, the media server 200 sends connection information to the session manager 400. Where a customer has interacted with a CTA, the connection information initially comprises a communications medium (e.g., mobile phone service), the customer's contact information for that communications medium (e.g., a phone number), and an identifier for the CTA (e.g., a CTA identification number or string). The session manager initiates a session initiation protocol (SIP) session by issuing an SIP invitation to the routing manager 300. The routing manager 300 receives the SIP invitation, retrieves one or more routing policies from the databases 700 using a route selector 310, determines an appropriate routing for the communication (e.g., to salesperson X at company Y who handles sales of the type of product advertised by the identified CTA), and sends the routing information to the media server 200, which proceeds to establish the connection.

The routing manager 300 selects an appropriate routing for incoming and outgoing communications based on information from the session manager. In this embodiment, the media server 200 sends connection information to the session manager 400. Where a customer has interacted with a CTA, the connection information initially comprises a communications medium (e.g., mobile phone service), the customer's contact information for that communications medium (e.g., a phone number), and an identifier for the CTA (e.g., a CTA identification number or string). The session manager initiates a session initiation protocol (SIP) session by issuing an SIP invitation to the routing manager 300. The routing manager 300 receives the SIP invitation, retrieves one or more routing policies from the databases 700 using a route selector 310, determines an appropriate routing for the communication (e.g., to salesperson X at company Y who handles sales of the type of product advertised by the identified CTA), and sends the routing information to the media server 200, which proceeds to establish the connection.

Figure 4:
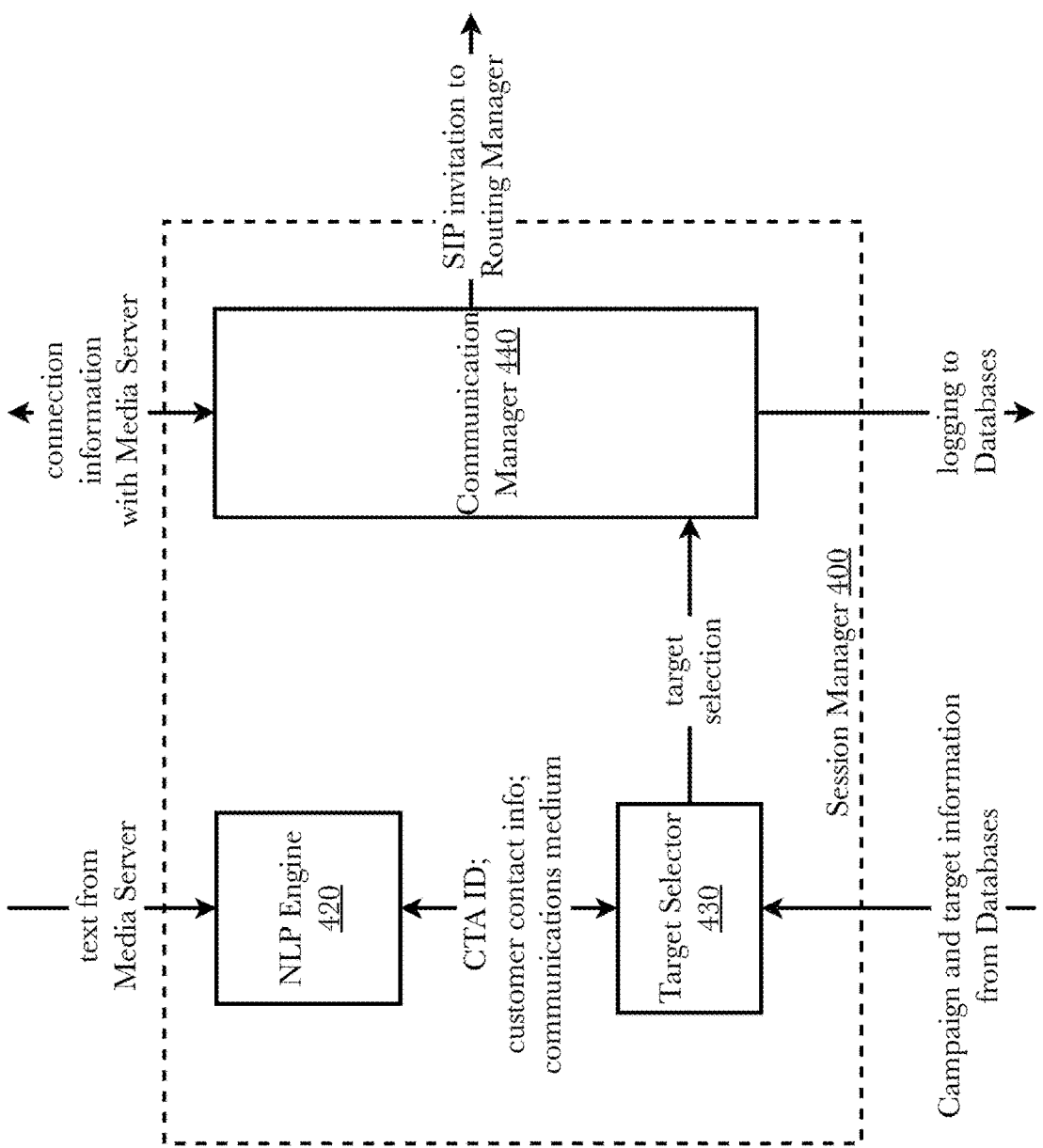
FIG. 4 is an exemplary session manager aspect of a communications and interaction system using SMS-based authorizations and personal non-fungible tokens.

FIG. 4 is an exemplary session manager aspect of a communications and interaction system using SMS-based authorizations and personal non-fungible tokens. This diagram restates and clarifies the previous system architecture diagram of FIG. 42 of the parent application (U.S. Ser. No. 17/942,227) and prior applications that have been incorporated herein by reference. The session manager 400 creates and manages each communication session between a client and customer. The session manager 400 creates session initiation protocol (SIP) communication sessions for each communication between a client and customer using the CTA identifier, the customer's contact information, and information about the communications medium being used. The session manager 400 monitors and logs the session, and terminates the session when the communication ends. In this embodiment, the session manager comprises a natural language processing (NLP) engine 420, a target selector 430, and a communication manager 440.

Where a customer has interacted with a CTA, an identifier for the CTA is obtained from one of a variety of methods (e.g., an identifier embedded in a link, a call to certain phone numbers designated to handle CTAs of a certain type, a CTA identifier in a text message from the customer, etc.). In this embodiment, where the interaction with the CTA is in text form (e.g., clicking on a website link CTA generates a pre-populated SMS containing the CTA identifier on the customer's mobile device which is sent to the media server), the text from the interaction with the CTA is sent to a natural language processing engine 420 which parses the text to extract the CTA ID, and possible other contextual information (such as the terms "lease" or "buy," which may determine to which department a lead is sent), along with the customer contact information (in this example, the phone number of the customer's mobile device from which the SMS was sent) and the communications medium (in this case, a return phone call to the phone number of the customer in response to the SMS).

Thus, the connection information initially comprises a communications medium (e.g., mobile phone service), the customer's contact information for that communications medium (e.g., a phone number), and an identifier for the CTA (e.g., a CTA identification number or string). Using the CTA identifier, the campaign and target information associated with the CTA identifier are retrieved from a campaign database for the relevant client, and a target selector 430 selects an appropriate client target to receive the communication depending on the connection information (e.g., a salesperson X in department Y at company Z who specializes in the type of product advertised by the CTA). After the target is selected, a communications manager 440 of the session manager 400 initiates a session initiation protocol (SIP) session by issuing an SIP invitation to the routing manager 300. After creation of the session, the communication manager 440 monitors and logs the session, and terminates the session when the communication ends.

Should the initially-selected target not be available, the target selector 430 may initiate a routing script that queries the databases 700 to determine next target resource. This process may be repeated until all potential targets of the client in the campaign are exhausted (i.e. no client resource is available to accept the call for that CTA). In that event, the voice call may be routed to a voicemail system corresponding to one of the client's resources or a general voicemail box. A notification of the failed attempt to connect with a live client resource may be sent to the client.

Figure 5:
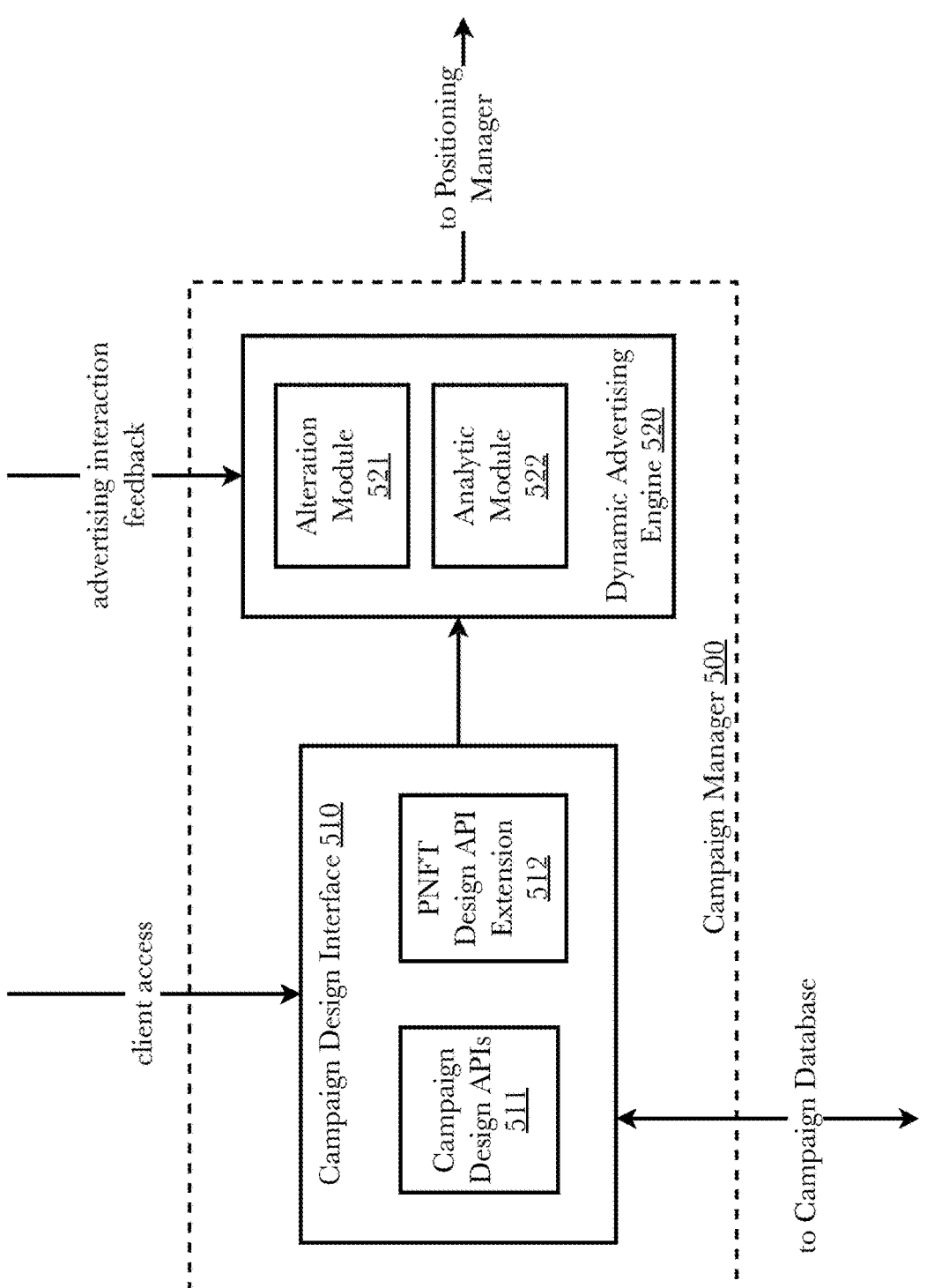
FIG. 5 is an exemplary campaign manager aspect of a communications and interaction system using SMS-based authorizations and personal non-fungible tokens.

FIG. 5 is an exemplary campaign manager aspect of a communications and interaction system using SMS-based authorizations and personal non-fungible tokens. This diagram restates and clarifies the previous system architecture diagram of FIG. 26 of the parent application (U.S. Ser. No. 17/942,227) and prior applications that have been incorporated herein by reference. The campaign manager 500 provides the client with an interface through which the client may create automated advertising campaigns which may be dynamically adjusted based on feedback from customer interactions with CTAs and other information. In this embodiment, the campaign manager comprises a campaign design interface 510 and a dynamic advertising engine 520. The dynamic advertising engine 520 portion of the diagram restates and clarifies reference number 5802 of FIG. 58 of the parent application (U.S. Ser. No. 17/942,227) and prior applications that have been incorporated herein by reference.

The campaign design interface 510 comprises one or more campaign design APIs 511 which allow clients to set up campaigns comprising products and services, target audiences, rules, schedules, budgets, and the like. Each campaign design API 511 provides one or more aspects of the interface such as a graphical interface, rule creation tools, budgeting tools, target audience selection tools, etc., and the collection of the campaign design APIs 511 allows the client to define complete marketing campaigns, which are stored in the campaign database of the databases 700. If PNFTs are used, the PNFT design API extension 512 allows access to a similar PNFT design interface in the token manager 800 for creation and implementation of PNFTs.

Once a marketing campaign is created and implemented, the dynamic advertising engine 520 can be configured to make automatic changes to the campaign (or an aspect of a campaign) based on feedback from interaction with CTAs and other information such as product or service sales numbers. In some embodiments, ad variants may be generated by dynamic advertisement engine 520. In some embodiments, ad variants may be generated semi-autonomously with input from business personnel. For example, dynamic advertisement engine 520 may receive data associated with an ad campaign and analyze it, and based on the analytic data it may suggest an element of an advertisement to be altered, which can then be reviewed and implemented by a client representative such as a business marketing manager. In some embodiments, ad variants may be generated autonomously. For example, dynamic advertisement engine 520 may receive analytic data associated with an ad campaign and based on the received data it may suggest an element of an advertisement to be altered, which can be automatically applied to the ad via the ad campaign data stored in campaign database 730.

A purpose of utilizing ad variants is to gather useful data about the efficacy, efficiency, and profitability of a given advertisement and/or an ad campaign. Implementing two similar ads with the only difference between the two being a single element alteration (i.e., A/B testing) can allow businesses to understand how elemental choices for an advertisement affect customer interaction. For example, an ad campaign for a hiking boot may be developed with the tagline "Reach New Heights With These Boots," and a variant ad may be developed the tagline "Tough On The Mountain, Gentle On Your Feet," wherein the only difference between both ads is the tagline. Both the baseline ad and the variant ad can then be deployed and customer engagement data with both the baseline and variant can be monitored and analyzed to determine which of the baseline or the variant led to better outcomes for the business running the ads and/or ad campaign. In some embodiments, ad campaign data may include a test plan for configuring the deployment of two variant advertisements. For example, a test plan may describe what element is to be tested and subsequently altered, the goals of the test plan (e.g., improving conversion rates), initial state of advertisement (i.e., baseline metric that describes current state of advertisement), the order of element alterations to be made, test design (e.g., how long to test the variants, which devices to test on, etc.) and the like. In some embodiments, test plans may be received, retrieved, or otherwise obtained from campaign database 730 by dynamic advertisement engine 520 as an input into suggesting element alterations.

According to some embodiments, the analytic module 522 may receive, retrieve, or otherwise obtain a plurality of data such as, but not limited to, details of interactions with CTAs, media stream data, ad campaign data, survey data, and business data, and may process the plurality of data in order to determine the efficacy of a given advertisement and/or ad campaign. In some embodiments, analytic module 522 may receive data pertaining to at least two advertisements comprising a baseline advertisement and a variant advertisement, and determine which of the two advertisements produced better results based upon analysis of the received data.

According to some embodiments, analytical data such as, for example, a determination of a better advertisement between at least two advertisements, may be received, retrieved, or otherwise obtained by dynamic advertisement engine 520. Dynamic advertisement engine 520 and/or alteration module 521 may process the analytical data together with ad campaign data (e.g., test plan information) in order to suggest at least one advertisement element to alter in order to form a new variant of an advertisement. For example, data analytics suggest that a first variant of a baseline advertisement was better at leading to product sales than the baseline version of the advertisement, and responsive to this analysis alteration module 521 can suggest an element alteration to the first variant to form a second variant. The first and second advertisement variants may then be deployed to various platforms via position manager 600 and the process of collecting data related to advertisement engagement/interaction can begin again using the first and second variant, wherein after statistically relevant data is collected, analytic module 522 may make a determination of whether the first variant or the second variant was better. The determination of a "better" advertisement can be based on statistically significant metrics such as, for example, ad clicks and conversion rates. In the case that the differences between two advertisements are statistically insignificant, dynamic advertisement engine 520 may suggest no alterations to an element. In some embodiments, the element to be altered is the same type of element (e.g., the tagline is altered between two advertisements).

In some embodiments, dynamic advertisement engine 520 may receive, retrieve, or otherwise obtain $3^{rd}$ party data to be used as an input when making element alteration suggestions. Because marketing is such a vital component of any business within any industry, there is a lot of market research data available regarding advertisement content and configuration which may be used by dynamic advertisement engine 520 to determine appropriate and effective element alterations. For example, studies have shown that an advertisement with a red call-to-action button outperforms a green call-to-action button by about 21%. The large difference in click rate between such a minor change shows the importance of testing different variants of a given advertisement in order to maximize customer engagement and improve conversion rates.

Figure 6:
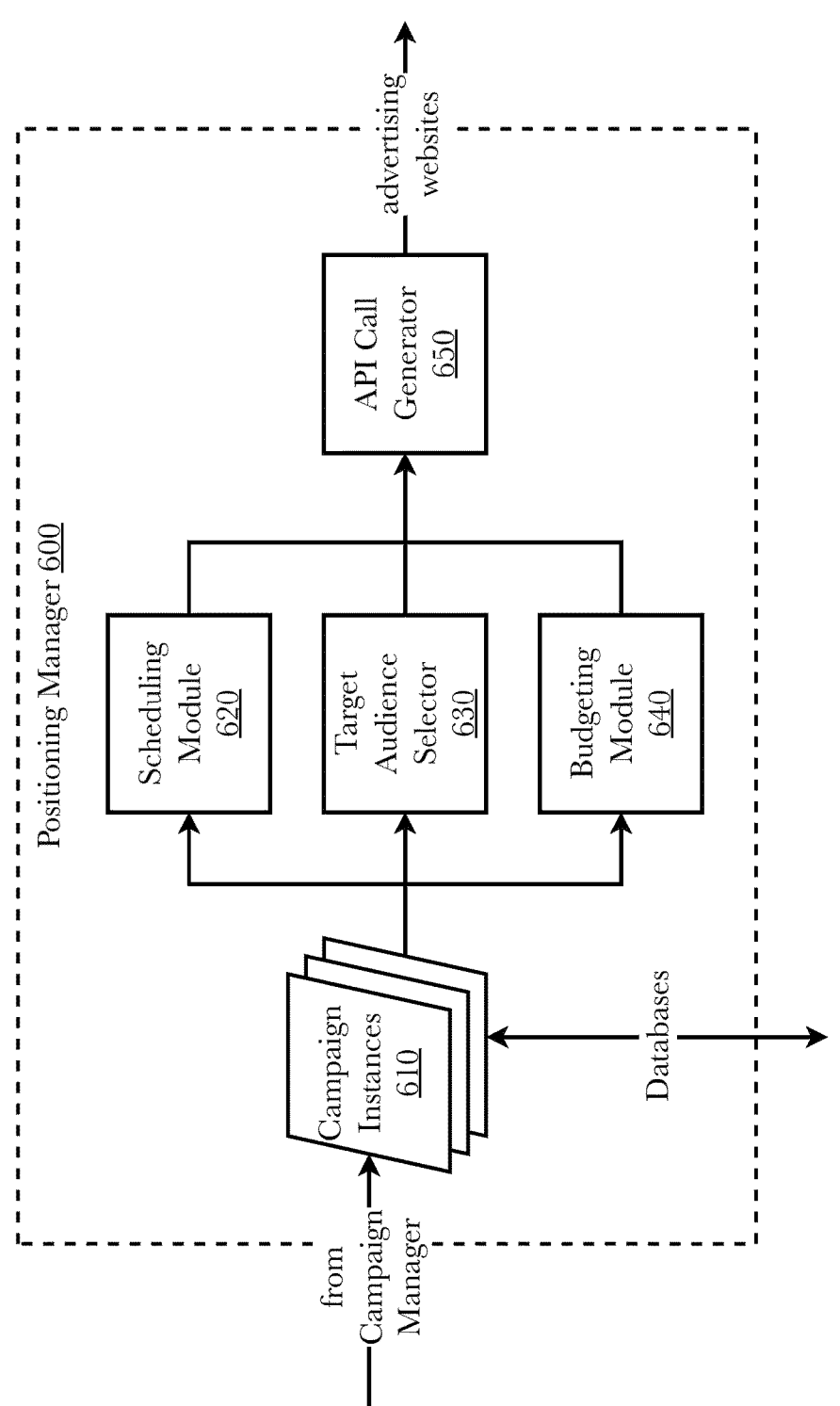
FIG. 6 is an exemplary positioning manager aspect of a communications and interaction system using SMS-based authorizations and personal non-fungible tokens.

FIG. 6 is an exemplary positioning manager aspect of a communications and interaction system using SMS-based authorizations and personal non-fungible tokens. In this embodiment, the positioning manager 600 creates campaign instances from a campaign, and automatically determines where and when to place CTAs for each campaign instance depending on scheduling, targeting, and budgeting goals.

The positioning manager 600 receives notification of the initiation of a campaign from the campaign manager, retrieves relevant information about the campaign from the databases 700, and creates one or more campaign instances 610 for implementation of the campaign. Not all campaigns will have multiple instances. Depending on the campaign configuration, each campaign instance will represent some portion or division of the campaign for implementation. For example, in a campaign by a dealership for automobile sales, instances may be generated for different types of cars which will be marketed to different target audiences. Campaign instances 610 will typically have rules associated scheduling, target audiences, and budgets. In this embodiment, each instance will is analyzed by a scheduling module 620 to identify scheduling rules and constraints and output an advertisement schedule, a target audience selector 630 to identify relevant target audiences and output a target audience selection, and a budgeting module 640 to track budgeting expenditures for the instance and output a remaining budget amount for advertising of the instance. The outputs of the scheduling module 620, target audience selector 630, and a budgeting module 640 are send to an API call generator 650, which generates an appropriate API call to a third party advertiser in accordance with the third party advertiser's ad placement API (as one example, the Google Ads API has more than 200 parameters that can be set to determine where and when an ad should be placed on its platform).

Figure 7:
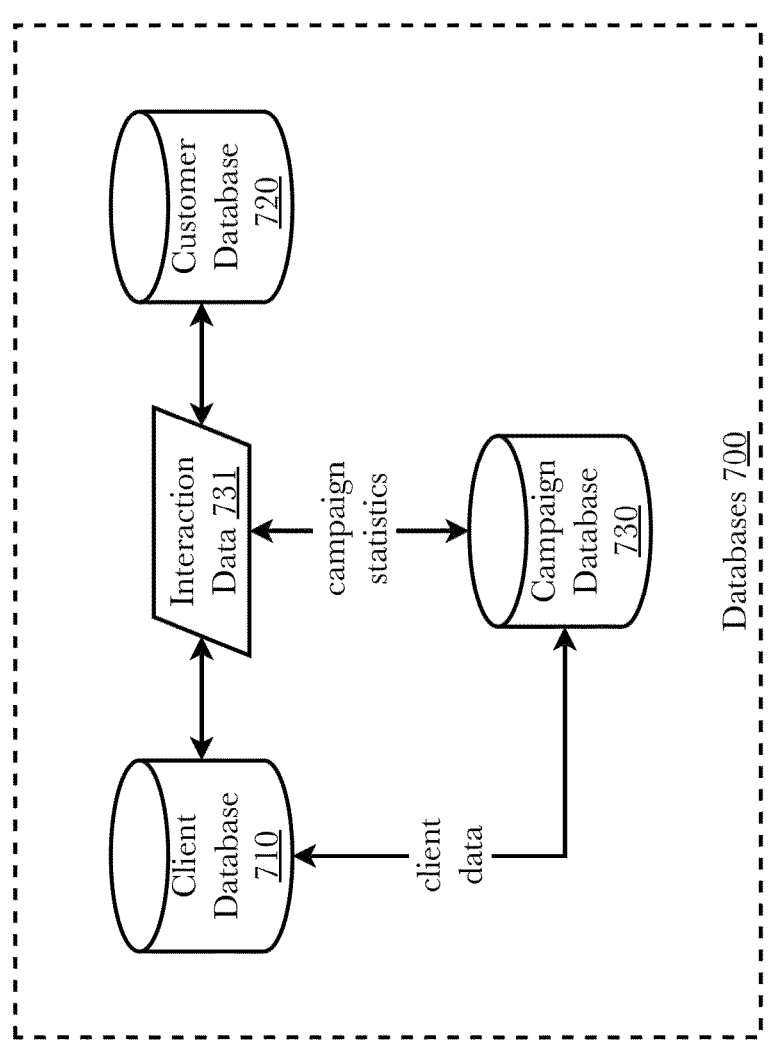
FIG. 7 is an exemplary set of databases for a communications and interaction system using SMS-based authorizations and personal non-fungible tokens.

FIG. 7 is an exemplary set of databases for a communications and interaction system using SMS-based authorizations and personal non-fungible tokens. The databases 700 store campaign information, client information, and customer information.

The client database 710 comprises information about the client for facilitating communications between clients and customers such as client contact information; target information for the client such as subsidiaries, office locations, departments, units, agents, sales representatives, and employees; logs of interactions with customers; records of the products, services, and campaigns associated with certain customers; and lists of campaigns associated with the client.

The customer database 720 has the same characteristics as described for ref. 172 of FIG. 1B and ref. 5204 of FIG. 52 of the parent application (U.S. Ser. No. 17/942,227) and prior applications that have been incorporated herein by reference. The customer database 710 comprises information about the client for facilitating communications between clients and customers such as customer contact information, logs of CTAs with which the customer has interacted, records of the products, services, and campaigns associated with CTAs with which the customer has interacted, customer purchase history, customer preferred contact method (e.g. mobile phone, e-mail), customer preferred contact times, and customer previous interaction history.

The campaign database 730 has the same characteristics as described for ref. 2604 of FIG. 58 of the parent application (U.S. Ser. No. 17/942,227) and prior applications that have been incorporated herein by reference. The campaign database 730 may take the form of a managed or unmanaged database, document-oriented database system, or SQL database, or other suitable form of database. Examples of types of database software that may operate include MYSQL™, ORACLE DATABASE™, MONGODB™, and others. The campaign database 730 may exist as a distinct physical device or be operating on another computing device that may perform other functions aside from operating, hosting and serving the campaign database 730. If the campaign database 730 is a distinct physical device, the database may be connected over a LAN or WAN, the Internet, a direct physical connection to another device, or some other network connection. The campaign database 730 may be a centralized database system. The campaign database 730 may be a distributed database system.

The campaign database 730 may be configured to store a plurality of ad campaigns including the associated ad campaign data for each ad campaign in the ad campaign database 730. In some embodiments, the ad campaign data specifies the different media platforms that will be used to broadcast the ad campaign. In some embodiments, ad campaign data may include one or more variants of an advertisement. In some embodiments, an advertisement variant may be an advertisement where at least one element of the advertisement has been altered in some form. Non-limiting examples of advertisement elements include: headlines and copywriting; call to actions (CTAs); images, audio, and video; subject lines (e.g., email ads); content depth (i.e., how much information to include in ad); product descriptions (e.g., length, placement, etc.); social proof (e.g., customer/purchaser reviews of product); media mentions; and landing pages. In some embodiments, elements may further include font, colors, ad placement, time and location (e.g., when and where is ad displayed), and audience.

Interaction data 731 may be generated from any interactions between clients and customers, and may be stored in any of the three databases 710-730, as necessary.

Figure 8:
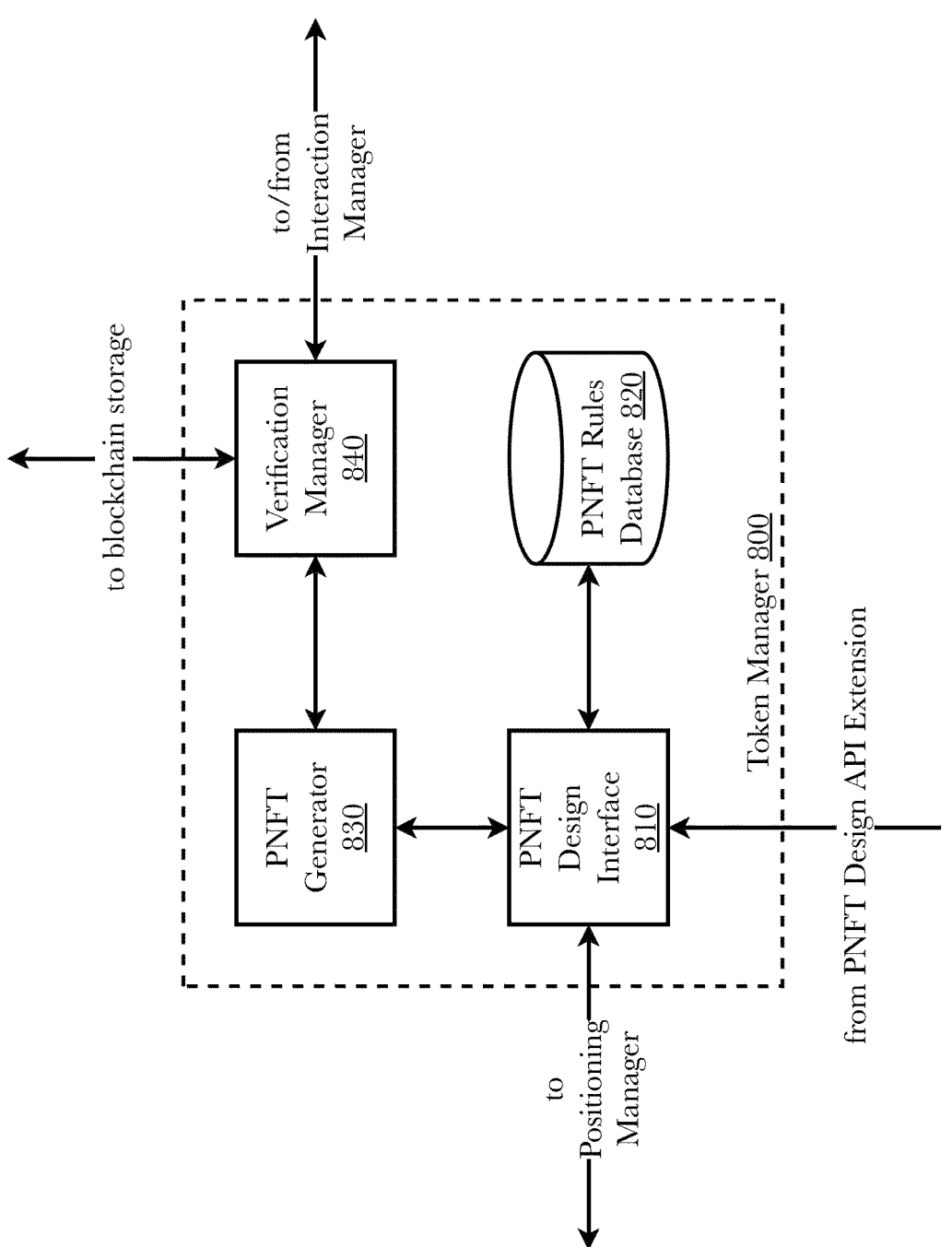
FIG. 8 is an exemplary token manager aspect of a communications and interaction system using SMS-based authorizations and personal non-fungible tokens.

FIG. 8 is an exemplary token manager aspect of a communications and interaction system using SMS-based authorizations and personal non-fungible tokens. The token manager 800 provides an interface for design and generation of PNFTs, establishment of automation rules for interactions with PNFTS, and verification of identities using PNFTs. In this embodiment, the token manager comprises a PNFT design interface 810, a PNFT rules database 820, a PNFT generator 830, and a verification manager 840.

The PNFT design interface 810 may be accessed directly or may be accessed via the PNFT design API extension 512 of the campaign manager 500. The PNFT design interface allows to set up personal non-fungible tokens (PNFTs) as universal, secure identities for online communications, interactions, and exchanges wherein each PNFT uniquely associates an image, sound, or other digital asset with a person's identity using a non-fungible token (NFT). An image, sound, or other digital asset is stored on a blockchain as an NFT, which uniquely and immutably associates the digital asset with the account owning that digital asset, thereby establishing a unique, secure personal identifier (a "personal non-fungible token" or PNFT) of the person owning that account for online communications and interactions. Links to the PNFT (also sometimes herein called "calls to action" or CTAs similarly those associated with marketing campaigns) can be customized via an online platform such that interaction with a given link or type of link initiates automated actions. Further, the online platform can be configured to automatically place the customized links to the PNFT in locations which will facilitate communications and interactions with the owner of the PNFT such as on websites, in communications such as emails and short message service (SMS) communications, and in advertisements and marketing messages.

Similarly to the campaign design APIs 511 of the campaign manager, the PNFT design interface 810 may comprise a graphical interface, rule creation tools, budgeting tools, target audience selection tools, etc., allowing the client to design automated rule sets for individual PNFT CTAs, groups of PNFT CTAs, or types of PNFT CTAs, whereby customer interactions with a given CTA will initiate certain automated actions such as requesting contact with the client, requesting authorization from the client, production of information to the client, or establishment of communications with the client. The CTAs associated with PNFTs operate similarly to CTAs associated with marketing campaigns, but are secure identifiers for a person or entity, and are not necessarily associated with marketing activity. For example, a CTA for a PNFT on a website may contain a company's trademarked logo. Interaction with the CTA provides automatic verification to the person interacting with the CTA that the website is, in fact, owned by the owner of the CTA. Thus, although CTAs for PNFTs can be used for marketing, they function primarily as secure personal identifiers and means for personal interaction with the owner of the PNFT (which can also be a business). The rules for automation of CTAs for PNFTs are stored in a PNFT rules database 820. A PNFT generator 830 generates PNFTs for each client and sends each generated PNFT to a verification manager 840 for verification of the uniqueness of the PNFT (i.e., that there is no duplicate of that particular PNFT for that particular client) and storage of the PNFT as an immutable entry on a blockchain. Because blockchains are immutable and all records of a blockchain are permanently stored on the blockchain, this ensures that each PNFT will be unique. The verification manager 840 also serves to verify the identity of the owner of a given PNFT by verifying the PNFT's identifier on the blockchain. Note that while each PNFT is unique, it is possible for the same person or entity to have more than one PNFT (e.g., the person may have a personal PNFT and also be the owner of multiple businesses, each with its own PNFT).

Figure 9:
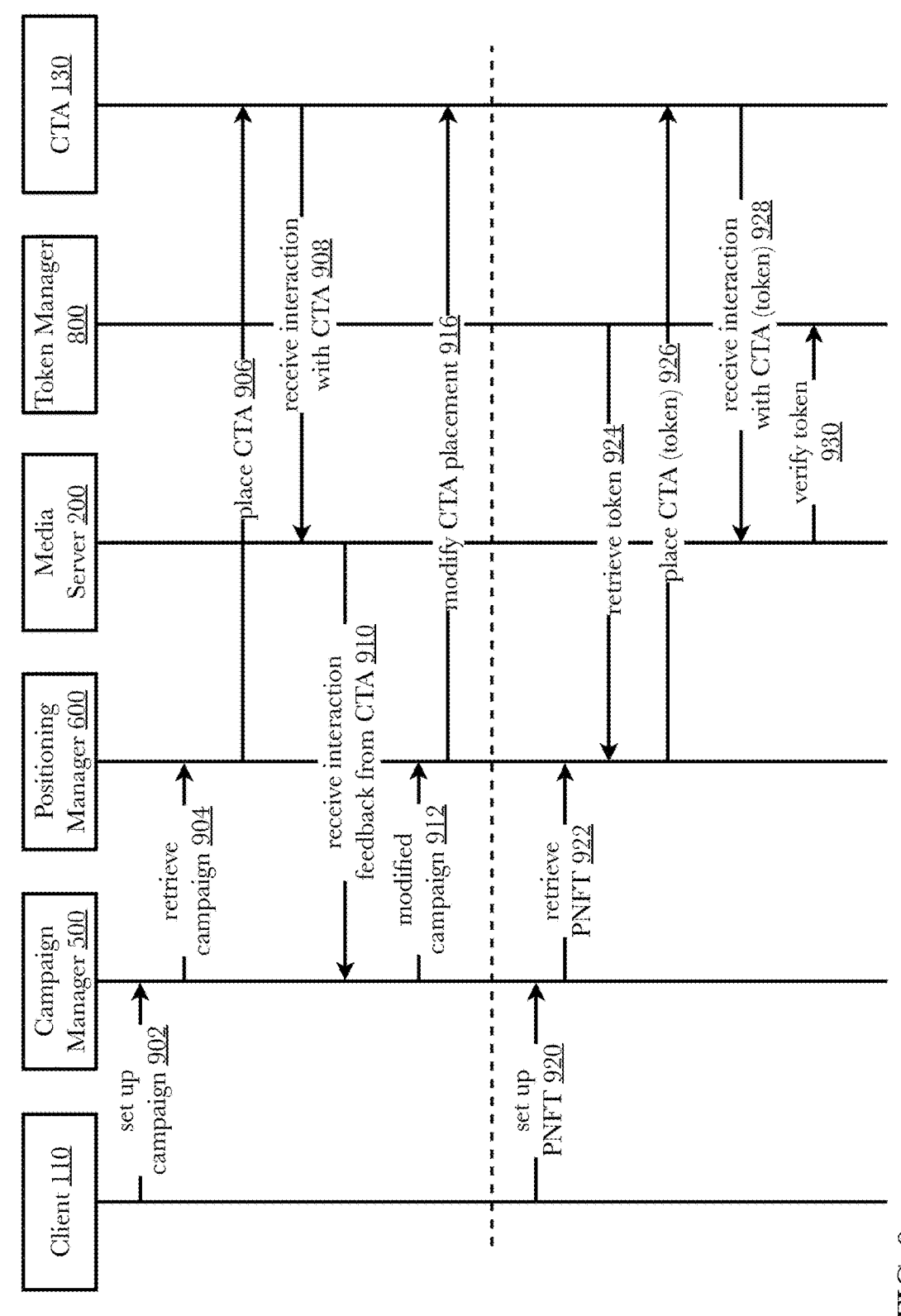
FIG. 9 is a messaging diagram showing exemplary messaging for setup and administration of ad campaigns and PNFTs.

FIG. 9 is a messaging diagram showing exemplary messaging for setup and administration of ad campaigns and PNFTs. For marketing campaigns, the client 110 first sets up a campaign 902 using the campaign manager 500. Once the campaign is set up, the positioning manager 500 retrieves the campaign 904 and places CTAs via third party advertising providers according to rules in the campaign. The media server 300 receives interactions with the CTA 908 and provides statistics and other feedback regarding interaction with the CTAs 910 to the dynamic advertising engine 520 of the campaign manager 500, which modifies the campaign based on the feedback. The positioning manager retrieves the modified campaign 912 and modifies CTA placement accordingly 916.

A similar process occurs for PNFT generation and placement. The client 110 sets up a PNFT 920, in this case via the PNFT design API extension 512 of the campaign manager 400. The positioning manager 600 retrieves a PNFT for placement 922, retrieves a token for the PNFT from the token manager 924, the token comprising the PNFT identifier and its associated image, sound, or other digital asset, and places a CTA including the token 926 in an appropriate online location via third party web servers or in appropriate messaging such as embedded in emails, text messages, etc. (in this case, the PNFT token). The media server 300 receives interactions with the CTA 928 and verifies the validity of the token 930 with the token manager 800. In this example, PNFTs are not automatically modified as with campaigns, although PNFT rules could be set up to do so.

Figure 10:
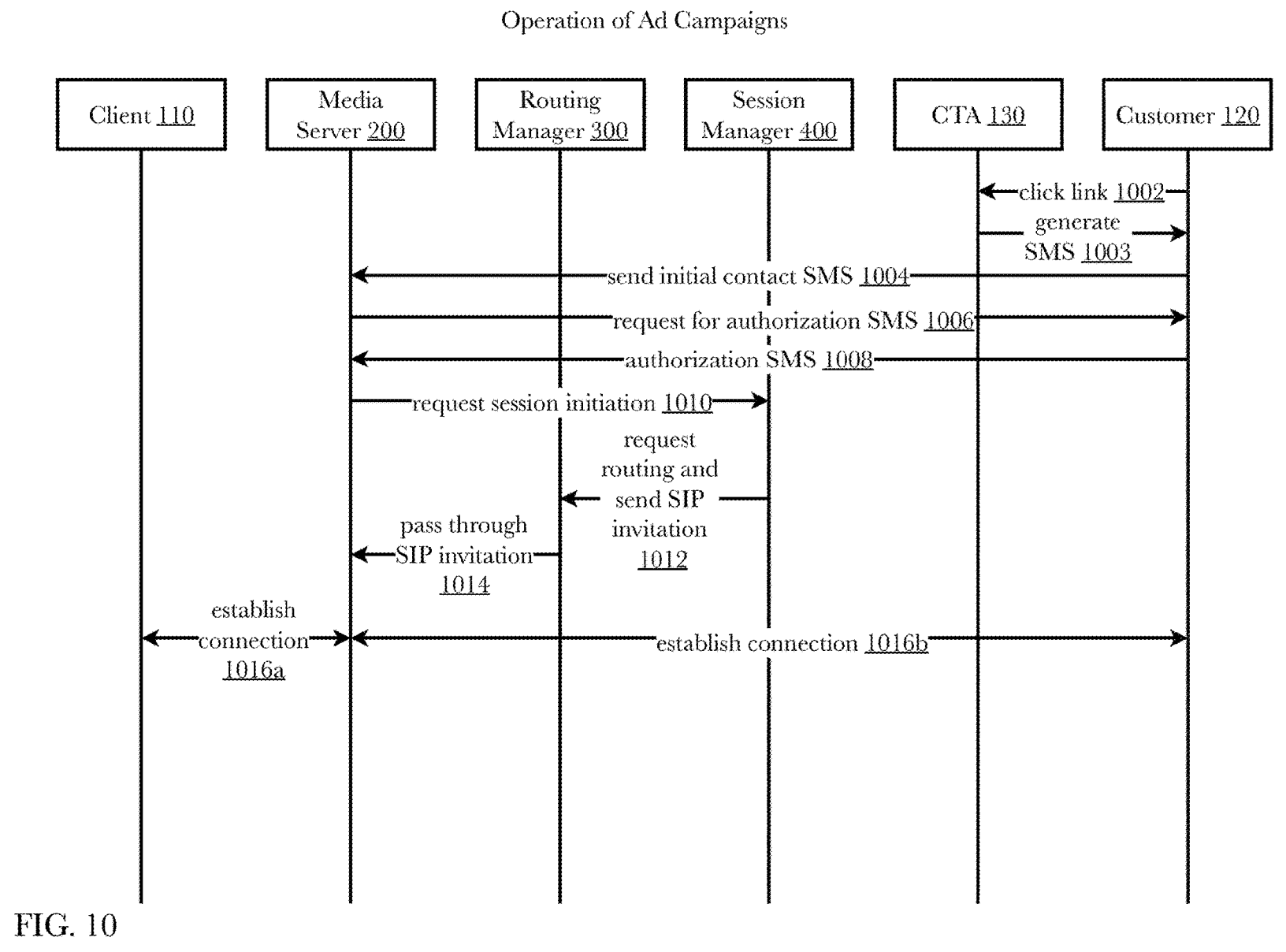

FIG. 10 is a messaging diagram showing exemplary messaging for operation of the system for ad campaigns. When a customer clicks on a link-based CTA 1002, the CTA causes the smartphone or other mobile device of the customer 120 to generate a first SMS (initial contact) 1004 on the smartphone which has been pre-filled with an SMS address code for the media server 200 and a CTA identifier. When the first SMS is sent from the smartphone, the media server 200 receives the first SMS, captures the CTA identifier and phone number of the smartphone, and sends a second SMS back to the smartphone with a link and a request for authorization to send the phone number to a third party for communications 1006. Clicking on the link in the second SMS sends a third SMS back to the server at the address code authorizing the transmission of the phone number to a third party 1008. In this way, authorization for capture of the user's phone number and establishment of communications with a third party can be established simply by having the user click on two automatically-generated SMS messages without having to otherwise enter any data on the smartphone. This method works universally on all smartphones with SMS technology without having to install additional applications. Note that while SMS technology is the primary example used herein, the invention is not so limited and other forms of mobile device interactions may be used, provided that an identifier for the mobile device can be obtained from the interaction (e.g., multi-media message service (MMS) messages, email addresses from email headers, caller ID from phone calls, caller ID from VOIP calls, etc.).

Once authorization has been established via text messaging, the media server 200 requests initiation of a session initiation protocol (SIP) session 1010 from the session manager 400. The session manager 400 generates an SIP invitation and sends it to the routing manager 300 with a request for routing 1012. The routing manager 300 selects a communications route and passes through the SIP invitation to the media server 200, which establishes an SIP connection through the media server 200 between the client 1016a and the customer 1016b.

Figure 11:
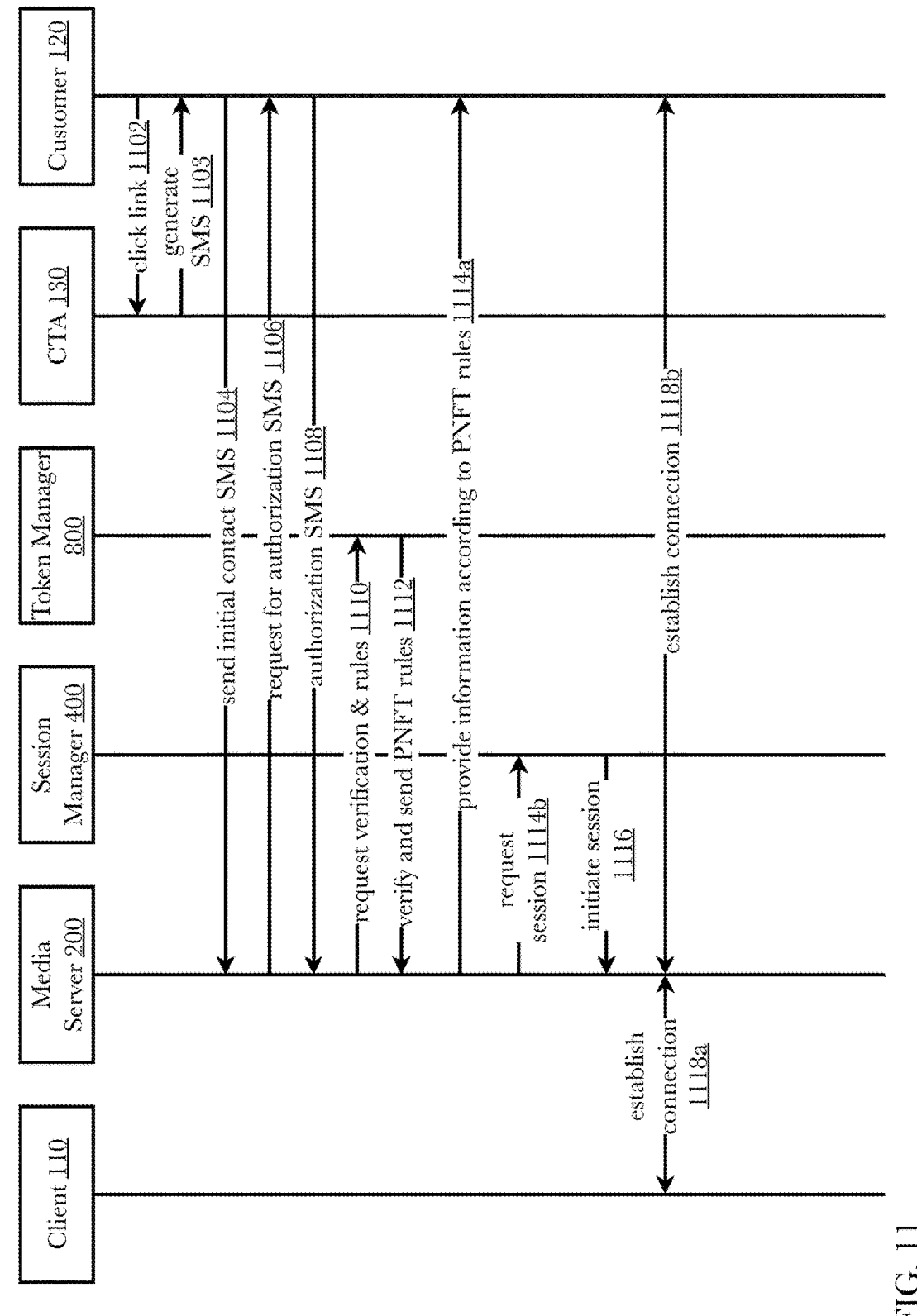
FIG. 11 is a messaging diagram showing exemplary messaging for operation of the system for use of PNFTs.

FIG. 11 is a messaging diagram showing exemplary messaging for operation of the system for use of PNFTs. When a customer clicks on a link-based CTA 1002, the CTA causes the smartphone or other mobile device of the customer 120 to generate a first SMS (initial contact) 1004 on the smartphone which has been pre-filled with an SMS address code for the media server 200 and a CTA identifier. When the first SMS is sent from the smartphone, the media server 200 receives the first SMS, captures the CTA identifier and phone number of the smartphone, and sends a second SMS back to the smartphone with a link and a request for authorization to send the phone number to a third party for communications 1006. Clicking on the link in the second SMS sends a third SMS back to the server at the address code authorizing the transmission of the phone number to a third party 1008. In this way, authorization for capture of the user's phone number and establishment of communications with a third party can be established simply by having the user click on two automatically-generated SMS messages without having to otherwise enter any data on the smartphone. This method works universally on all smartphones with SMS technology without having to install additional applications. Note that while SMS technology is the primary example used herein, the invention is not so limited and other forms of mobile device interactions may be used, provided that an identifier for the mobile device can be obtained from the interaction (e.g., multi-media message service (MMS) messages, email addresses from email headers, caller ID from phone calls, caller ID from VOIP calls, etc.).

Once authorization has been established via text messaging, the media server 200 requests verification of the PNFT token from and receipt of rules for the token 1110 from the token manager 800. The token manager 800 verifies the PNFT token and sends rules associated with it 1112 to the media server 200. Depending on the rules, the media server may take one of several actions, two of which are shown here. The media server 200 may automatically forward information 1014a to the customer 120 according to the PNFT rules, or may request session initiation 1114b from the session manager 400. If a session request is sent 1114b, the session manager initiates an SIP session 1116, which establishes an SIP connection through the media server 200 between the client 1018a and the customer 1018b.

Figure 12:
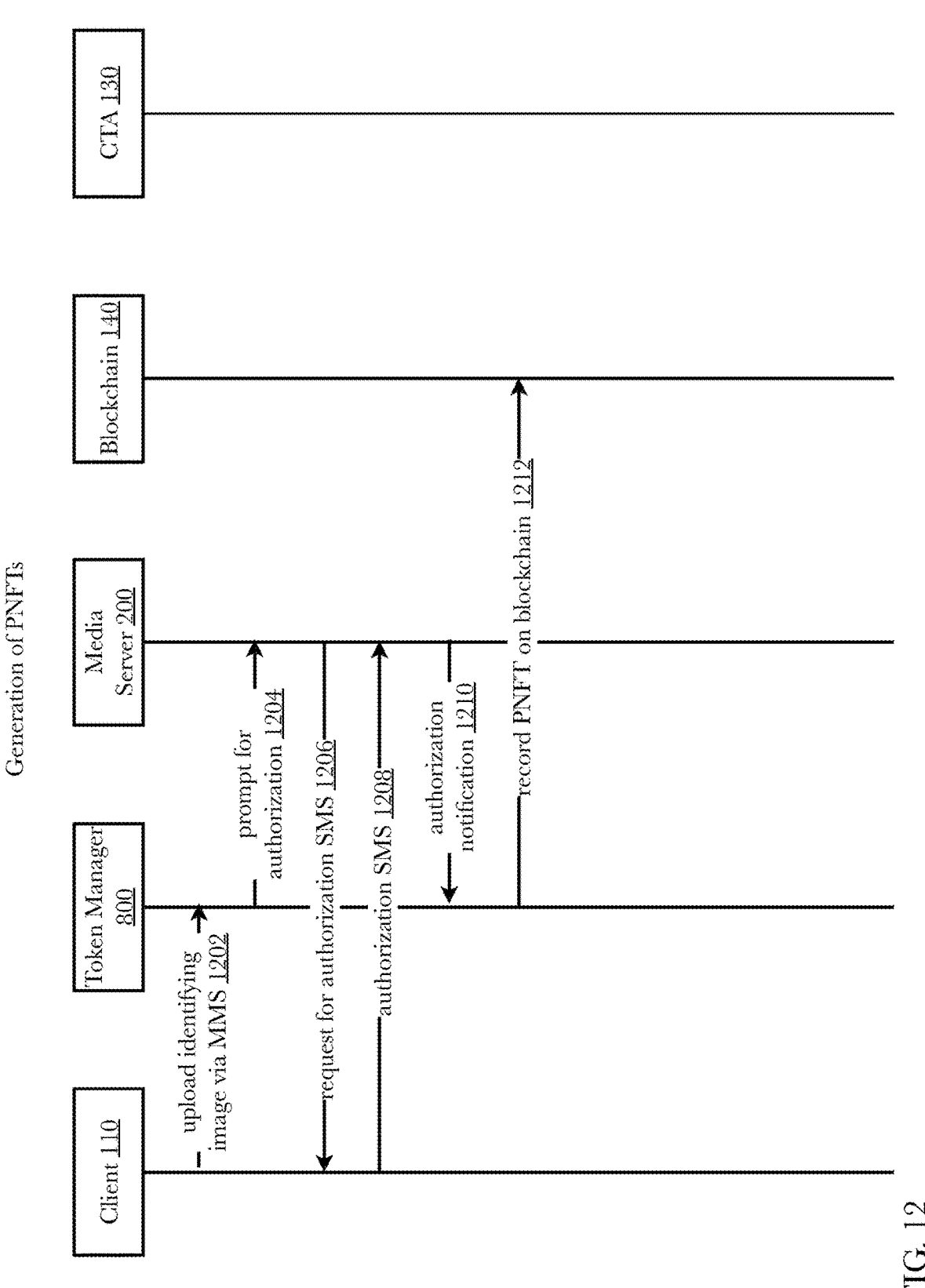
FIG. 12 is a messaging diagram showing exemplary messaging for generation of PNFTs.

FIG. 12 is a messaging diagram showing exemplary messaging for generation of PNFTs. In this example, a client 110 uploads an identifying image, sound, or other digital asset 1202 to the token manager 800 via a multi-media message service (MMS) for generation of a PNFT. The token manager 800 receives the digital asset and, using the phone number from the MMS, prompts the media server 1204 for authorization 1204. The media server 200 sends a prompt for authorization 1204 to the media server 200 including the phone number captured from the MMS. In a manner similar to the SMS-based authorizations that occur when a customer clicks on a CTA, the media server 1206 sends an SMS back to the client device 110 with a link and a request for authorization to record a PNFT on a blockchain 1206. Clicking on the link in the SMS sends another SMS back to the media server 200 authorizing the recording of the PNFT with the client's digital asset 1008. The media server 200 notifies 1210 the token manager 800 of the approval, and the token manager 800 proceeds to record the PNFT on the blockchain 1212. In subsequent actions (not shown) the publication manager 600 publishes CTAs containing the token for the PNFT in appropriate locations.

Figure 13:
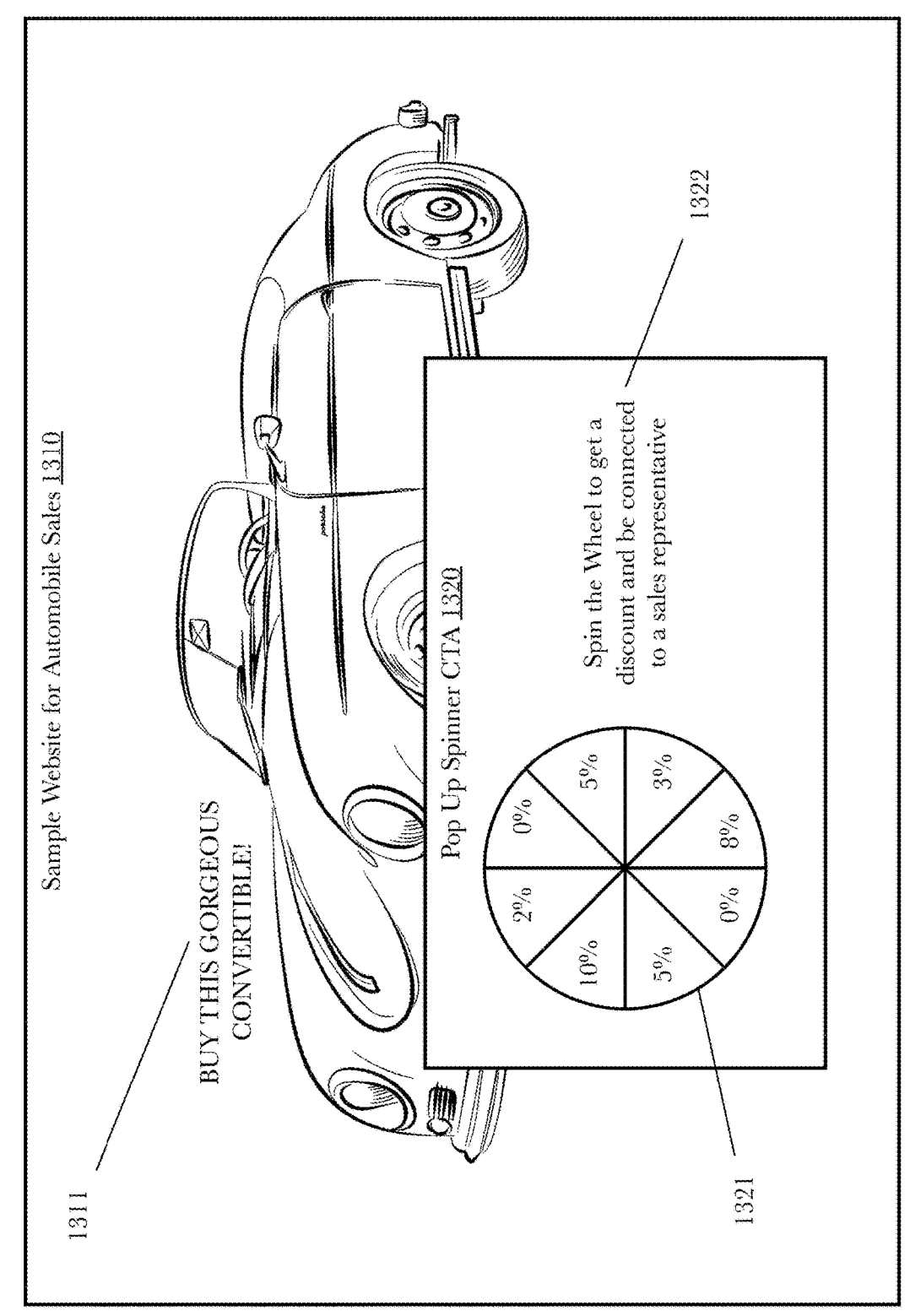
FIG. 13 shows an example of usage of CTAs in website advertising.

FIG. 13 shows an example of usage of CTAs in website advertising. This example shows an exemplary webpage 1310 which advertises the sale of automobiles 1311. A pop-up window 1320 contains a CTA 1320 in the form of a clickable spinner 1321 with instructions to click on the spinner 1322 to spin the wheel and get a discount. Clicking on the CTA 1321 on a smartphone or other mobile device causes the messaging application on the mobile device to generate and display a pre-filled SMS on the smartphone. Sending the pre-filled SMS acts as the initial interaction with the CTA that starts the authorization and communication processes previously described herein.

FIG. 14 shows an example of PNFT usage in emails. This example shows an exemplary email exchange 1410 in which a Jane Smith sends a first email 1414 to a John Smith. John Smith's reply 1411 contains his PNFT token (a type of CTA) comprising a clickable image 1412 and instructions 1413 for interacting with the image. The PNFT token in John Smith's email securely identifies the email as coming from him, and the clickable image 1412, when clicked, verifies that the image is associated with John's PNFT and initiates communications with John through the system described herein. In other words, the PNFT token comprising the clickable image 1412 acts as a universal identifier for communications with John. This PNFT token may be placed in any online location or inserted into any type of digital communication that allows images, sounds, or other digital assets. For types of communication that do not support images or sound, a text link may be substituted for the image or sound, but will still allow verification of the PNFT stored on the blockchain.

FIG. 15 shows an example of usage of CTAs in advertising sign beacons. In this example, the CTA is a real estate sales sign 1510 that contains both a printed CTA 1511 and an electronic beacon 1512 that broadcasts an electronic CTA signal comprising a CTA identifier and SMS address code. A customer may interact with either form of CTA. To interact with the printed CTA, the customer simply needs to follow the instructions on the sign and text the word "BUY" to SMS address code "12345" using the customer's mobile phone 1520 as shown in ref. 1523. Alternately, the mobile phone 1520 may be running an application configured to detect the signal from the electronic beacon, notify the customer of the beacon detection 1521 and request approval to send an SMS related to the CTA using a confirmation button 1522. If approved, an SMS with the word "BUY" to SMS address code "12345" is automatically generated 1523. In either case, the first SMS (an initial contact) 1523 will be received by the media server 200, and will be associated with a campaign via the SMS address code to which the text was sent (alternately, the SMS may contain the CTA identifier) which will send to the mobile phone a request for authorization SMS as shown in ref. 1524 ("Reply YES to get more information on house at 987 Sycamore Street. Your Caller ID information will be sent to a sales representative."). Replying "YES" to this second text 1525 authorizes the system to connect the customer to the client according to the campaign rules and target information of the client.

Figure 16:
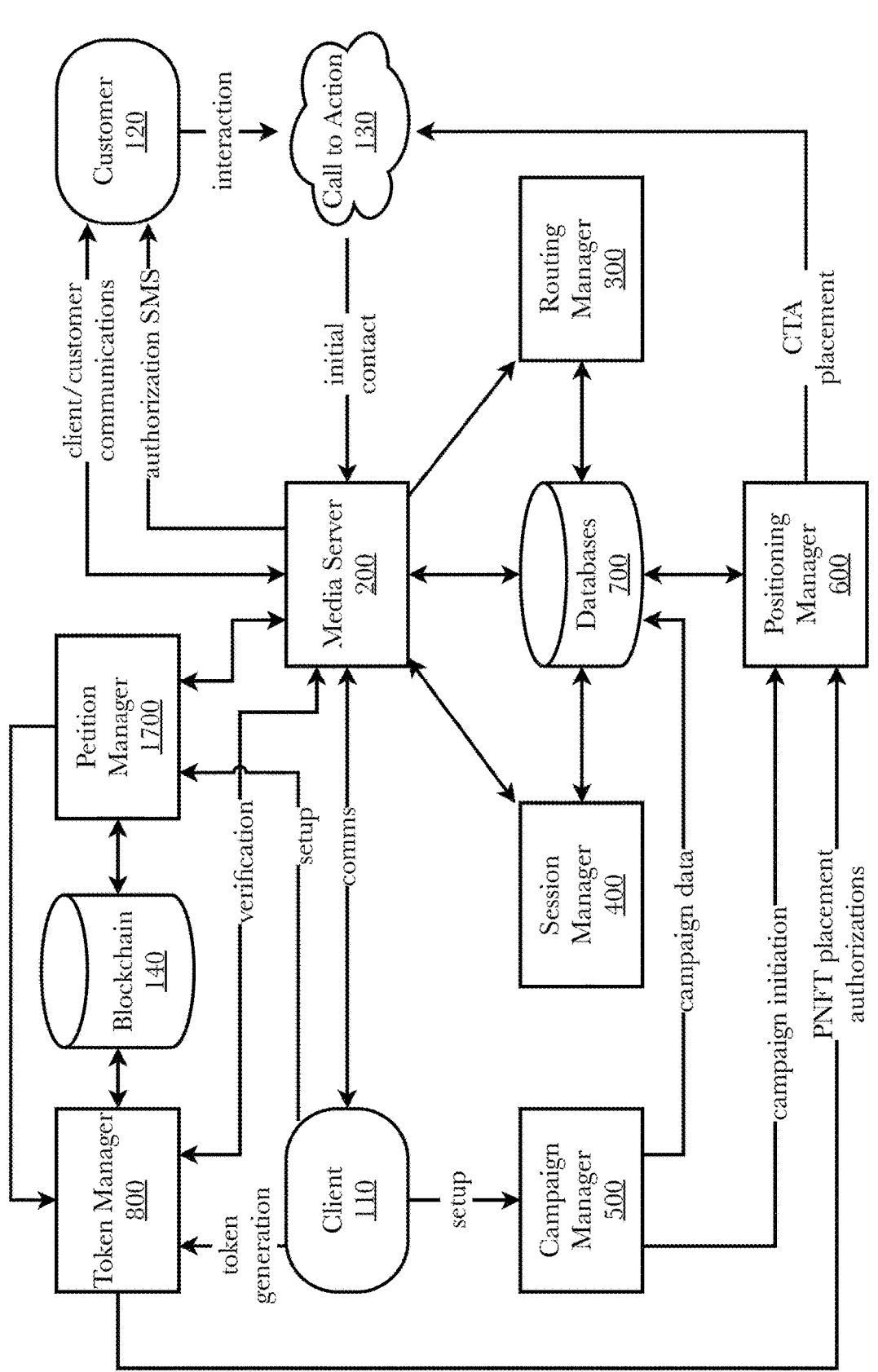
FIG. 16 is an exemplary system architecture for a communications and interaction system for digital petition management.

FIG. 16 is an exemplary system architecture for a communications and interaction system for digital petition management. In this exemplary embodiment, the system comprises a media server 200, a routing manager 300, a session manager 400, a campaign manager 500, a positioning manager 600, databases 700, a token manager 800, and a petition manager 1700. The system facilitates communications and interactions between clients 110 and customers 120 and digital petition management using calls to action 130. A client 110 is any person or entity (e.g., a business entity) wishing to engage in petitioning and who has established a petition campaign or established a personal non-fungible token (PNFT) for that purpose. A customer 120 is any person or entity (e.g., a business entity) wishing to sign a petition or seek more information about a petition associated with a client 110. Petition interactions between clients 110 and customers 120 are initiated by a customer's interaction with a call to action (CTA) 130. The CTA 130 is any means for contacting a client 110 through the system comprising a way to identify the CTA 130 and the client with which it is associated. For online and other digital CTAs (websites, emails, in-app advertisements, etc.), the CTA 130 will generally be generated and placed by the system in accordance with a client's 110 petition campaign rules or PNFT rules. However, non-electronic CTAs are also possible such as printed CTAs in print advertising, signage, or in-store displays.

The media server 200 acts as the communication channel interface between client and customer devices, passing various forms of communications media (emails, texts, traditional telephone, VOIP, etc.) between the devices. The routing manager 300 selects an appropriate routing for incoming and outgoing communications based on information from the session manager. The session manager 400 creates and manages each communication session between a client and customer by creating a session initiation protocol (SIP) communication sessions for each communication between a client and customer using the CTA identifier, the customer's contact information, and information about the communications medium being used. The session manager 400 monitors and logs the session, and terminates the session when the communication ends. The campaign manager 500 provides the client with an interface through which the client may create automated advertising campaigns which may be dynamically adjusted based on feedback from customer interactions with CTAs and other information. The positioning manager 600 creates campaign instances from a campaign, and automatically determines where and when to place CTAs for each campaign instance depending on scheduling, targeting, and budgeting goals. The databases 700 store campaign information, client information, and customer information. The token manager 800 provides an interface for design and generation of PNFTs, establishment of automation rules for interactions with PNFTS, and verification of identities using PNFTs. The petition manager 1700 provides the client with an interface through which the client may create automated petition campaigns which may be dynamically adjusted based on feedback from customer interactions with CTAs, metadata associated with a customer's mobile device, and other information. Position manager 1700 is also responsible for verifying the identity of an individual associated with an obtained digital signature in order for the petition to be in compliance with all governing rules and regulations, as well as any client-specific rules that a client can define during petition creation and setup. Verified digital signatures and any associated metadata can be stored in blockchain 140 providing an immutable record of digital petition signatures.

Figure 17:
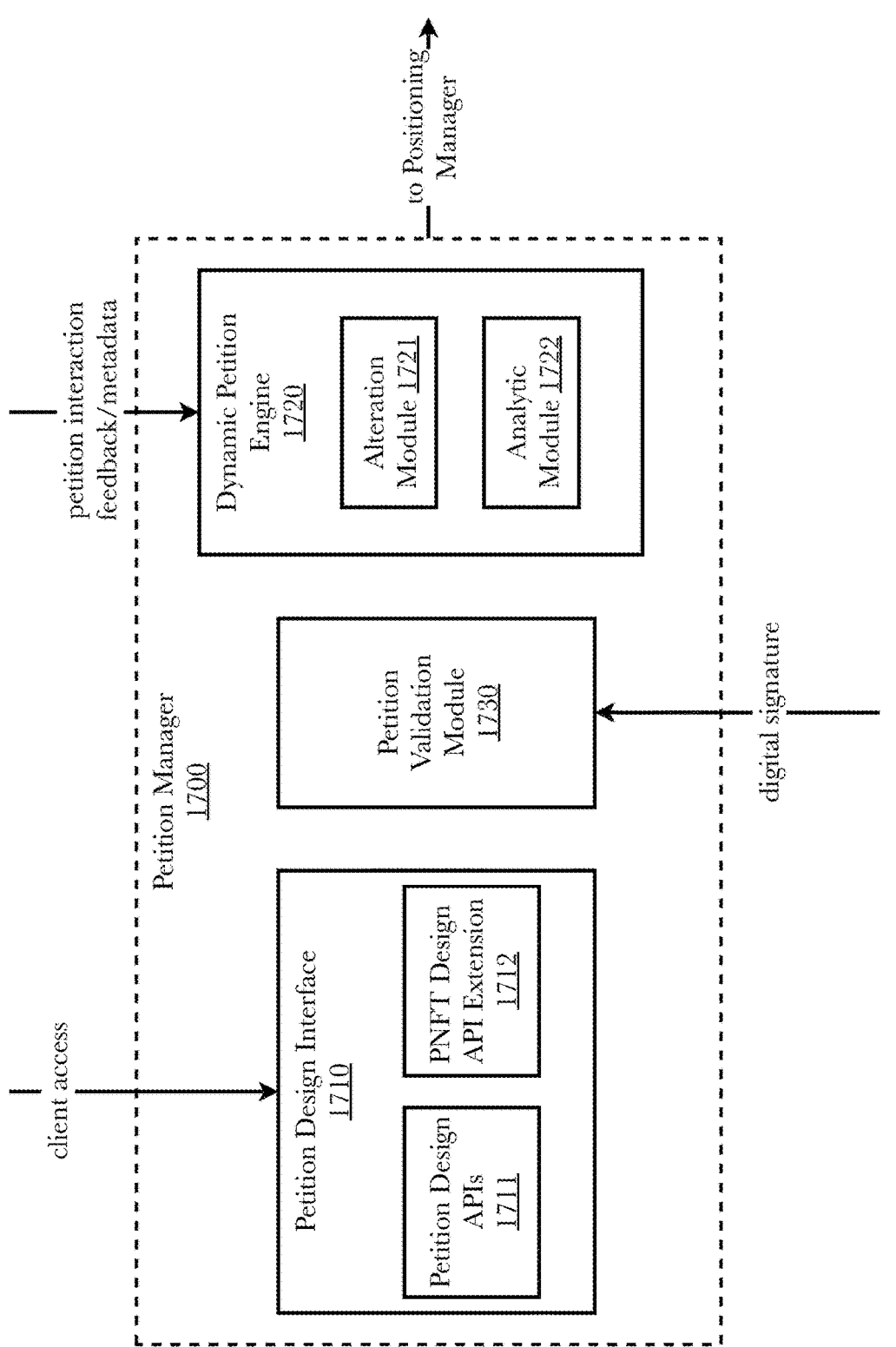
FIG. 17 is an exemplary petition manager aspect of a secure interaction and digital petition management system.

FIG. 17 is an exemplary petition manager aspect of a secure interaction and digital petition management system. The petition manager 1700 provides the client with an interface through which the client may create automated petition campaigns which may be dynamically adjusted based on feedback from customer interaction with CTAs, metadata, and other information. Petition manager 1700 further provides the client automated petition validation, ensuring that the petition complies with all rules and regulations associated with a petition or petition campaign, as well as verifying that all digital signatures are legitimate and that each digital signature corresponds to only one individual. In this embodiment, petition manager 1700 comprises a petition design interface 1710, a petition validation module 1730, and a dynamic petition engine 1720.

The petition design interface 1710 comprises one or more petition design APIs 1711 which allow clients to set up petitions comprising a subject of the petition (e.g., healthcare access, term limits, local referendums, etc.), target audiences, rules, schedules, budgets, and the like. Each petition design API 1711 provides one or more aspects of the interface such as a graphical interface, rule creation tools, budgeting tools, target audience selection tools, etc., and the collection of petition design APIs 1711 allows the client to define the complete petition campaigns, which are stored in the petition database of the databases 700. If PNFTs are used, the PNFT design API extension 1712 allows access to similar PNFT design interface in token manager 800 for creation and implementation of PNFTs.

In some implementations, a PNFT may be minted and associated with a created petition campaign. In these implementations, a client 110 (e.g., an individual or organization) can use petition design interface 1711 to create a petition campaign with all the requisite campaign details. This information and identifying information associated with the client, may be sent to token manager 800 which mints a new PNFT and stores it on a distributed ledger such as a blockchain. The minted PNFT associated with a petition campaign is useful for a variety of purposes. First, because the PNFT is only minted for a client that can provide identifying and verifiable information and the PNFT cannot be maliciously altered after it has been minted, this provides potential petition signees a secure call to action wherein the information they provide (e.g., digital signature, address, metadata, etc.) is going to a legitimate, verified, trusted end point (i.e., client 110). In operation, a PNFT associated with a petition campaign may be used as CTAs and positioned by positioning manager 600 in the same way non-PNFT CTAs are positioned. A PNFT used as a call to action can include images or words that associate the PNFT with the petition, for example, a petition to raise the minimum wage may have an associated PNFT that is the image of multiple dollar signs with the words "Raise the wage floor, get paid more!" This exemplary petition PNFT may then provide a clickable link that when clicked on redirects an interested individual to a website where the individual can read more information about the petition campaign and digitally sign the petition. Additionally, the PNFT acting as a CTA when interacted with would cause a first SMS message to be automatically generated in the individual's default messaging application on hie or her mobile device. By sending this first SMS message, the individual may receive a second SMS message confirming that they would like more information about or to sign the petition associated with the petition PNFT CTA.

Once a petition campaign is created and implemented, the petition validation module 1730 can be configured to autonomously verify that each petition is valid based on various factors such as petition rules defined during petition creation (e.g., petition signees must be of this age, live within this geographic region, etc.) and compliance rules associated with a petition (e.g., local, state, or federal compliance rules/laws that regulate petitioning actions, etc.). For example, petitions often only permit a voter/citizen/person to sign the petition once (i.e., no duplicate signatures) and therefore petition validation module 1730 can perform a check against each digital signature on a petition as it is received to verify that each digital signature and its associated person only appears once on the petition signature list. Generally, petitions require some basic information and components that are common across most petitions. For example, a successful petition should include at least a brief, clear statement of purpose, supporting facts, a request for action, and signatures (i.e., digital signatures) of citizens. Petition verification module 1730 can be configured to verify that at least those components of a petition are available before the petition campaign can be implemented.

Petition design interface 1710 could provide default templates for petitions which have empty data fields wherein the above mentioned petition details can be assigned. In such an implementation, petition verification module 1730 can perform a check on the data fields to determine whether the data fields were filled out or left empty, in which case petition manager 1700 can generate an error message or notification alerting the client 110 e.g., petition creator, author, designer, etc., that the petition is insufficient and requires more information.

In some embodiments, during petition campaign creation a client 110 can specify the information included in a petition and the rules that govern the petition. For example, the client 110 can indicate the purpose of the petition, supporting facts and information, a location(s) where the petition is to be distributed, how many digital signatures are required, how long to keep the petition campaign active, age or demographic restrictions, and an endpoint where a completed petition is to be sent. The endpoint may be a specific person, such as a state senator, government official, or campaign manager. The endpoint may be an entity or organization such as a governmental office, a grassroots organization, and/or the like. The endpoint may comprise at least a name, an address or email address, and a phone number associated with the endpoint. For example, the petition may have parameters that specify a total of 100,000 unique digital signatures from citizens are required and the petition is to be sent to a senator's office when the required signature total has been acquired. Petition manager 1700 verifies each digital signature and keeps a running count of the total number of signatures obtained in real-time, and in the example above could identify when the signature total has been met and can automatically send the signed petition to the senator's office.

In various embodiments, petition manager 1700 is configured to verify a digital signature by using information stored in customer database 720. For example, customer database 720 may comprise customer information such as a customer's phone number, a customer's public key, a customer's personal identifying information including, but not limited to, a name, address, email address, biometrics, and a voting history. In such an embodiment, a media server 200 may gather the individual's phone number responsive to receiving a first SMS/MMS message, and then generate a second SMS/MMS message that requests the individual's digital signature. The individual can send a third SMS/MMS, or alternatively according to some embodiments, click on a link embedded in the second SMS/MMS message, in order to send the digital signature. Media server 200 and/or petition manager 1700 can both be configured to receive the digital signature. In some implementations, media server 200 receives the digital signature and can send the digital signature, the phone number, and any metadata associated with the mobile device or digital signature to petition manager 1700 accompanied by a request for digital signature verification. At petition manager 1700, the digital signature can be verified, using the phone number, that the individual associated with the digital signature matches the same phone number stored on customer database 720.

In some implementations, petition manager 1700 is configured to utilize public-private key encryption to verify received digital signatures associated with a petition. In these implementations, an individual can provide any information a petition may require (e.g., name, address, email, etc.) and digitally sign the petition using their private key. Petition verification module 1730 can receive a digital signature and verify that it came from individual using their public key. As the digital signature uses the individual's private key, that individual is the only person who could create the signature. In some embodiments, an individual's public key may be stored in customer database 720 as part of the individual's customer profile. In other embodiments, an individual's public key may be stored on a block in a blockchain. In some embodiments, petition verification module 1730 may store verified digital signatures on a block of a blockchain associated with a petition, thereby providing an immutable record of petition signees. In these embodiments, petition verification module 1730 may compare received digital signatures with digital signatures stored on the blockchain in order to determine if the individual associated with the digital signature has already digitally signed the petition. If a received digital signature does match a stored digital signature on the blockchain, then the digital signature can be discarded, and optionally, media server 200 can be instructed to generate an SMS message to the sender of the digital signature alerting them that they have already provided their signature to the petition.

In some implementations, the petition is created and implemented digitally using various CTAs which when interacted with by an individual (e.g., voter, citizen, etc.) cause the system to generate a pre-filled first SMS message to the mobile device associated with that individual. The first SMS message may comprise an identifier to the call to action. The individual may then send the auto-generated, pre-filled SMS message to the indicated recipient. This first SMS message may then be received by media server 200 which captures the phone number of the mobile device from the first SMS message, determines the appropriate petition associated with the identifier, and sends a second SMS message to the individuals mobile device requesting authorization to add the individuals digital signature to the petition. The individual may then send an SMS message authorizing the addition of the digital signature to the petition. In some embodiments, the second SMS message may comprise a link that directs the petition signee to a landing page associated with the petition, wherein on the landing page the signee can provide their digital signature and any other information that may be required to be provided (e.g., address, email, voting county, etc.).

In some embodiments, the digital signature associated with an individual may be in the form of a PNFT associated with an individual. Because PNFTs are stored on a blockchain and associated with an individual's name, image, or likeness, as well as the individual's phone number, PNFTs are particularly well suited for providing digital signatures for petition purposes and use cases. Using a PNFT as a digital signature, an individual can provide a unique identifier that identifies the PNFT associated with the digital signature. In operation, petition manager 1700 can receive a digital signature comprising a PNFT identifier and use the identifier to verify the identity of the individual by verifying that the PNFT token associated with the PNFT identifier matches the PNFT token stored on the blockchain database 140. If the PNFT token and identifiers match, then the individual can be verified and their digital signature and information can be added to the digital petition. In some implementations, token manager 800 may receive the PNFT identifier and perform the PNFT token verification.

In some implementations, an individual may interact with a call to action associated with a petition campaign and responsive to the interaction a first SMS message is auto-generated in the individual's messaging application on the individual's computing device (e.g., smart phone, smart wearable, tablet, laptop, computer, etc.) which the individual can send and be received by media server 200. Media server 200 receives the first SMS message, comprising at least the individual's phone number and a petition identifier, and uses the identifier to determine the petition campaign associated with the call to action. When the proper petition campaign has been determined, a second SMS message is sent to the individual's mobile device requesting authorization to add the individuals digital signature to the petition. The individual may respond to the second SMS message by providing their digital signature in the form of their individual PNFT by providing a unique identifier associated with the PNFT such as a globally unique identifier (GUID) that points to the location of the PNFT in a distributed ledger such as a blockchain. In some implementations, an individual may provide a digital signature by sending a link (e.g., a URL) to petition manager 1700, the link may contain metadata that may specify a bundle of rights or actions that the recipient (e.g., petition manager 1700, and/or the individuals or entities that created and deployed the petition campaign) is authorized to utilize. For example, for a petition an individual can reply to the second SMS message by replying with a link tied to their PNFT which allows the recipient of the link to download the individual's name, address, county, location, and demographic data for petition purposes.

Once a petition campaign is created and implemented, the dynamic petition engine 1720 can be configured to make automatic changes to the petition campaign (or an aspect of the campaign) based on feedback from interaction with CTAs and other information such as signature counts and petition signee demographics. In some embodiments, petition variants may be generated by dynamic petition engine 1720. In some embodiments, petition variants may be generated semi-autonomously with input from petition-affiliated personnel (e.g., volunteer organizations, lobbyists, etc.). For example, analytic module 1722 and/or alteration module 1721 may receive data associated with a petition campaign and analyze it, and based on the analytic data it may suggest an element of the petition to be altered, which can then be reviewed and implemented by a client representative such as a grass-roots organization manager. In some embodiments, petition variants may be generated autonomously. For example, dynamic petition engine 1720, or one of its components such as alteration module 1721, may receive analytic data associated with a petition campaign and based on the received data it may suggest an element of the petition to be altered, which can be automatically applied to the petition via the petition data stored in petition database 740. As a simple example, petition demographic data may be received and analyzed, and indicate that certain counties where the petition campaign is being run have resulted in more signatures than other counties, this information may be used to increase the penetration of the petition campaign in the counties where more signatures have been gathered because the analytic data indicates that the counties are favorable to position the petition is advocating for. As another example using the same set of analytic information in the previous example, dynamic petition engine 1720 may alter an aspect of the petition to include a message to residents of the counties where there are a larger number of petition signees, such as by including a message stating, "X number of citizens in your area agree with the petition and have included their signature" or "X percent of Y county support referendum Z."

In some implementations, a digital signature may also comprise various metadata associated with the mobile device. For example, the metadata may include, but is not limited to, date and time data of when the digital signature was sent/received by petition manager 1700 and geolocation data associated with the computing device when the digital signature was provided by the individual. Geolocation data may be gathered using an individual's mobile device GPS system. In embodiments where an individual interacts with a petition campaign on a computer or laptop using a web application or embedded call to action on website, the IP address associated with the computing device can be used to determine the geolocation of the individual who provide his or her digital signature via web interface. Dynamic petition engine 1720 can leverage and analyze the metadata included in the received digital signatures, as well as any stored demographic data associated with an individual or group of individuals that all provided their digital signature to the petition, to improve both the design and the positioning for a petition campaign. For example, geolocation information may be used to determine the most successful placement of call to actions such as, for example, by identifying that 37% of petition signees interacted with a call to action on a popular news website, and therefore the petition campaign should position more call to actions across the popular news website and on similar websites or websites most often linked to from the popular news website. The result from this type of petition placement analysis may be sent to positioning manager 600 which can use the result to adjust and optimize the placement of petition campaign related CTAs.

Figure 18:
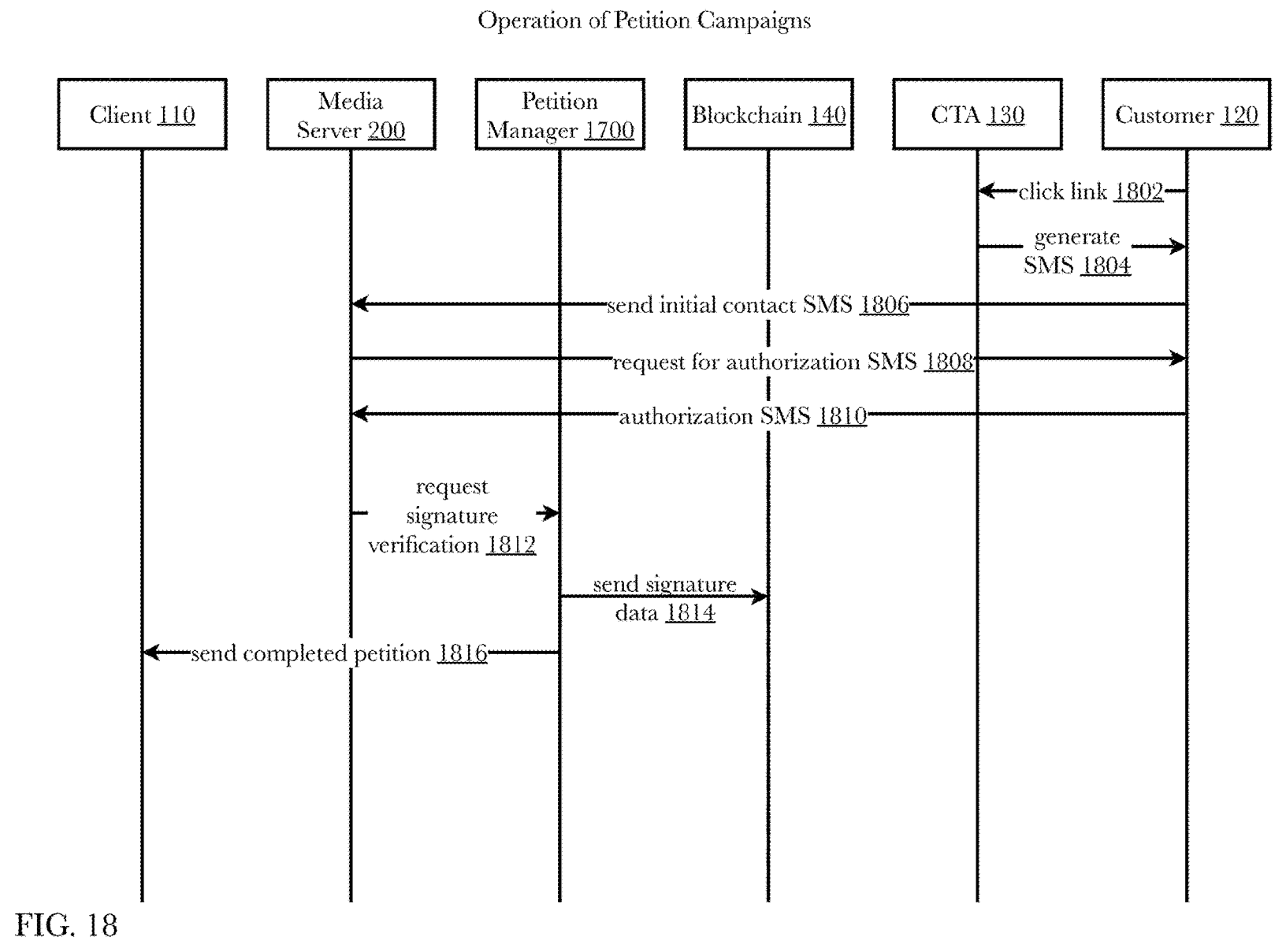

FIG. 18 is a messaging diagram showing exemplary messaging for operation of the system for petition campaigns. When a customer clicks on a link-based CTA 1802, the CTA causes the smartphone or other mobile device of the customer 120 to generate a first SMS (initial contact) 1804 on the smartphone which has been pre-filled with an SMS address code for the media server 200 and a CTA identifier. When the first SMS is sent from the smartphone 1806, the media server 200 receives the first SMS, captures the CTA identifier and phone number of the smartphone, and sends a second SMS back to the smartphone with a link and a request for a digital signature 1808. Clicking on the link in the second SMS sends a third SMS back to the server at the address code comprising a digital signature and various types of metadata 1810. In this way, authorization for capture of the user's digital signature for application to a petition can be established simply by having the user click on two automatically-generated SMS messages without having to otherwise enter any data on the smartphone. This method works universally on all smartphones with SMS technology without having to install additional applications. Note that while SMS technology is the primary example used herein, the invention is not so limited and other forms of mobile device interactions may be used, provided that an identifier for the mobile device can be obtained from the interaction (e.g., multi-media message service (MMS) messages, email addresses from email headers, caller ID from phone calls, caller ID from VOIP calls, etc.).

Once authorization has been established via text messaging, the media server 200 requests for digital signature verification 1812 from the petition manager 1700. The petition manager 1700 verifies the digital signature using one or more mechanisms such as, using the phone number associated with the customer, using public-private key processes, using PNFT identifiers and a blockchain database 140, and/or the like, responsive to the request for verification 1812. Upon successful verification, petition manager 1700 sends 1814 the digital signature data and any metadata to a blockchain database 140 where the digital signature and metadata can be stored on a block of the blockchain. The petition manager 1700 can send a completed petition 1816 (e.g., a petition that satisfies the requirements for completion as defined by the petition client 110.) For example, a completion requirement or parameter may be the total number of digital signatures required by the petition. In this example, petition manager 1700 monitors the total number of signatures and when the total signature parameter is met, petition manager 1700 can send the completed petition 1816 to the appropriate endpoint as defined by the client 110 during petition campaign setup.

Figure 19:
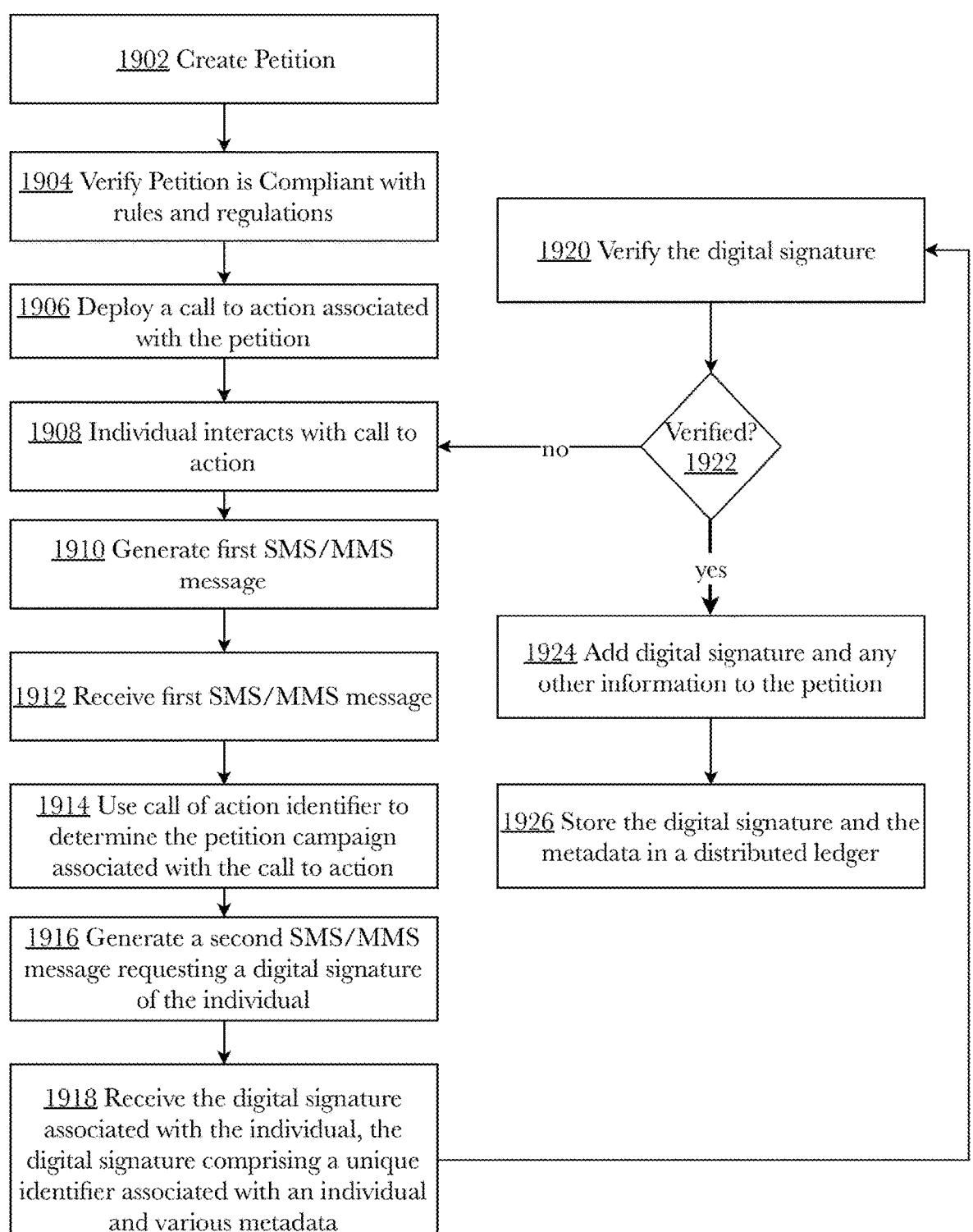
FIG. 19 is a flow diagram illustrating an exemplary method for setup and operation of a petition campaign, according to an aspect.

FIG. 19 is a flow diagram illustrating an exemplary method for setup and operation of a petition campaign, according to an aspect. According to the aspect, the process begins at step 1902 when a client 110 creates a digital petition or digital petition campaign using petition design interface 1710. During petition creation, a client 110 is able to define petition details or parameters that can be used to configure the petition. For example, petition parameters may include, but is not limited to, a total number of digital signatures required for petition completion, a target demographic (e.g., age group, ethnic group, economic class, education based group, etc.), a location in which the petition or petition campaign is to be implemented (e.g., a county or counties, a state or province, a city, etc.), a statement of purpose for the petition, supporting facts, and/or the like. Step 1904 is an optional step that can be conducted by verifying the petition is compliant with any rules or regulations that may govern the design and distribution of a digital petition and that may also regulate the acquisition of digital signatures. To assist petition manager 1700 in compliance verification, a compliance database or client database 710 may be used which comprises information from local, state, and federal rules/regulations that govern petitions. This type of information may be manually added to either database by a client 110 before, during, or after creation of a digital petition or digital petition campaign. At step 1906 positioning manager 600 may deploy and place CTAs associated with the digital petition across various media including, but not limited to, an Internet website or embedded in a communication message, the call to action may comprise a clickable link or button, the clickable link or button further comprising coding instructions configured to generate, when clicked, a pre-filled first SMS or MMS message on an individual's mobile device. At step 1908 an individual interacts with the CTA causing the pre-filled SMS/MMS message to be generated in the default messaging application on the individual's mobile device as step 1910. At step 1912 media server 200 is configured to receive the first SMS/MMS message and use the call to action identifier to determine the petition or petition campaign associated with the call to action at step 1914. Media server 200 then generates a second SMS/MMS message requesting the individual to submit a digital signature at step 1916. Media server 200 can then receive, at step 1918, the digital signature associated with the individual via a third SMS/MMS message or via a link embedded in the second SMS/MMS message. The digital signature may comprise a unique identifier associated with the individual and various types of metadata.

Petition manager 1700 may then obtain the digital signature, the unique identifier, and the metadata in order to verify the identity of the individual associated with the digital signature at step 1920. In some embodiments, the unique identifier may be a phone number captured by media server 200 when the first SMS/MMS message is sent from the individual's mobile device and verified by validating that the digital signature originated from a mobile device associated with the phone number of a individual stored in customer database 720. In other embodiments, the digital signature may be provided by an individual using his or her private key, wherein the digital signature is verified using a corresponding public key stored in customer database 720. In another embodiment, digital signature may be a PNFT token or a unique PNFT identifier associated with an individual, wherein the digital signature is verified by comparing the PNFT identifier with stored PNFT tokens to identify a match between PNFT identifier and PNFT token. During digital signature verification step 1922, if the digital signature cannot be verified then the process goes back to step 1908 and the system waits until an individual interacts with a deployed CTA. If instead, the digital signature is verified, then petition manager 1700 adds the digital signature and any other information (e.g., metadata, individual's name, address, etc.) to the digital petition at step 1924. As a last step 1926, according to this aspect, petition manager 1700 can store the digital signature and the other information in a distributed ledger. In some embodiments, the distributed ledger is a blockchain ledger or blockchain network. As an additional step not shown, petition manager 1700 can monitor the digital petition campaign to identify when a petition completion parameter has been met or surpassed, and then send a completed petition to an appropriate endpoint.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 20:
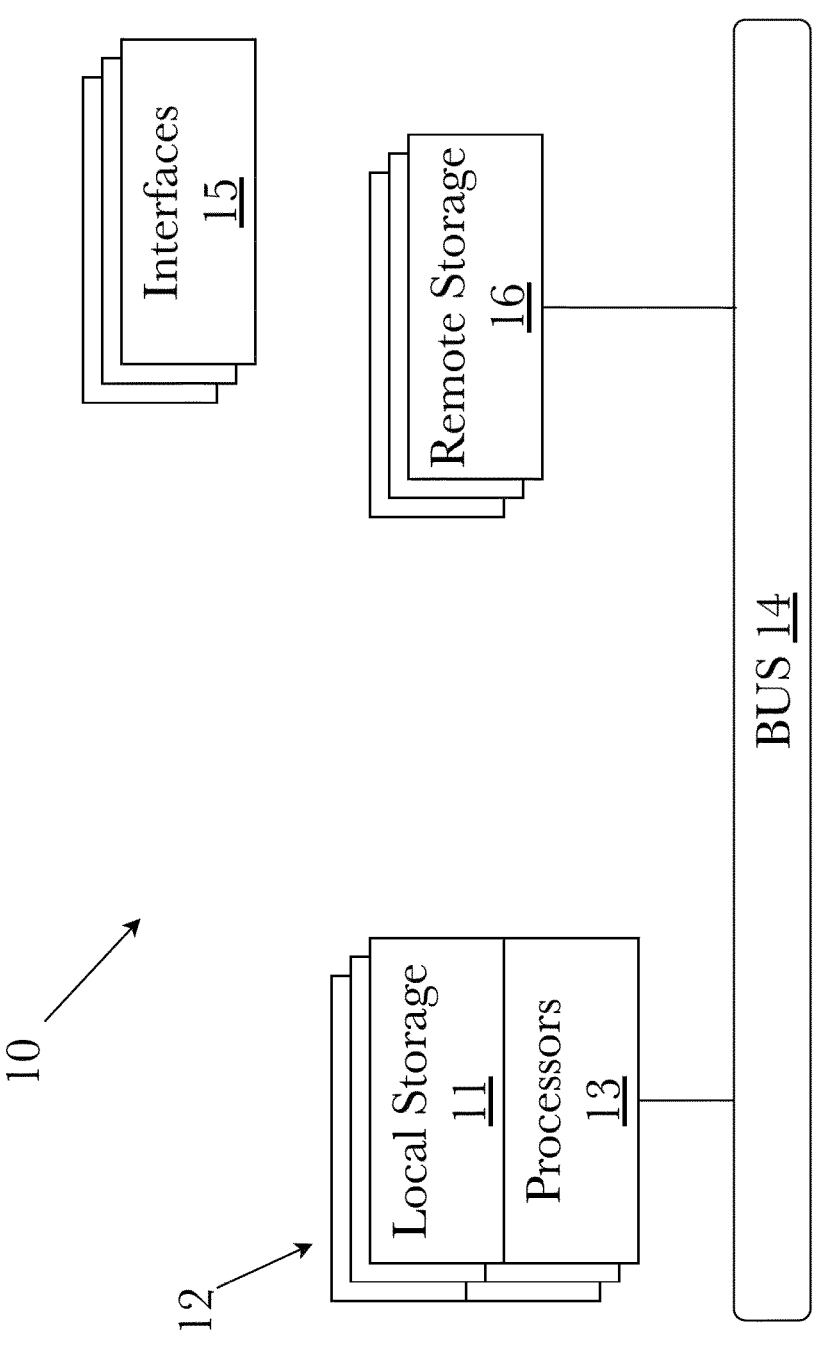
FIG. 20 is a block diagram illustrating an exemplary hardware architecture of a computing device.

Referring now to FIG. 20, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 20 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 21:
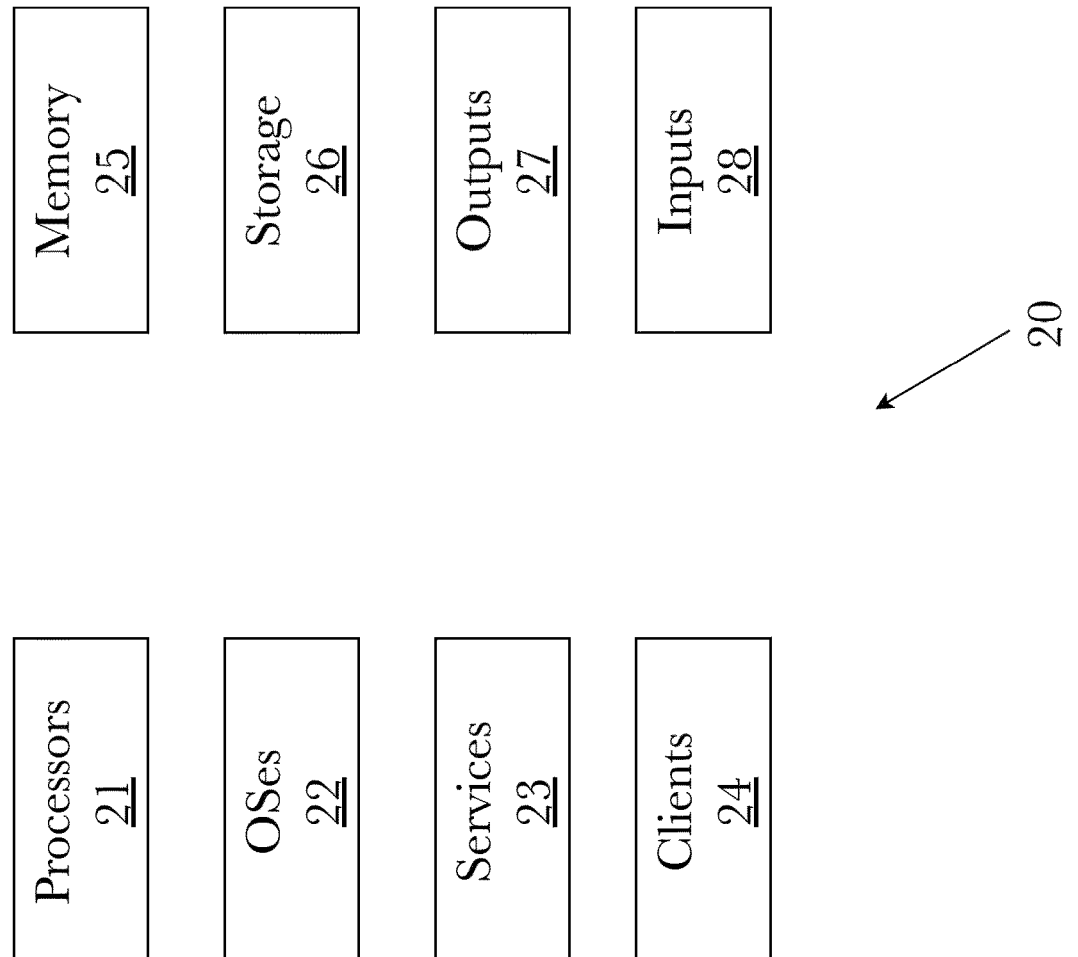
FIG. 21 is a block diagram illustrating an exemplary logical architecture for a client device.

In some embodiments, systems may be implemented on a standalone computing system. Referring now to FIG. 21, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 20). Examples of storage devices 26 include flash memory, magnetic hard drive, CD-ROM, and/or the like.

Figure 22:
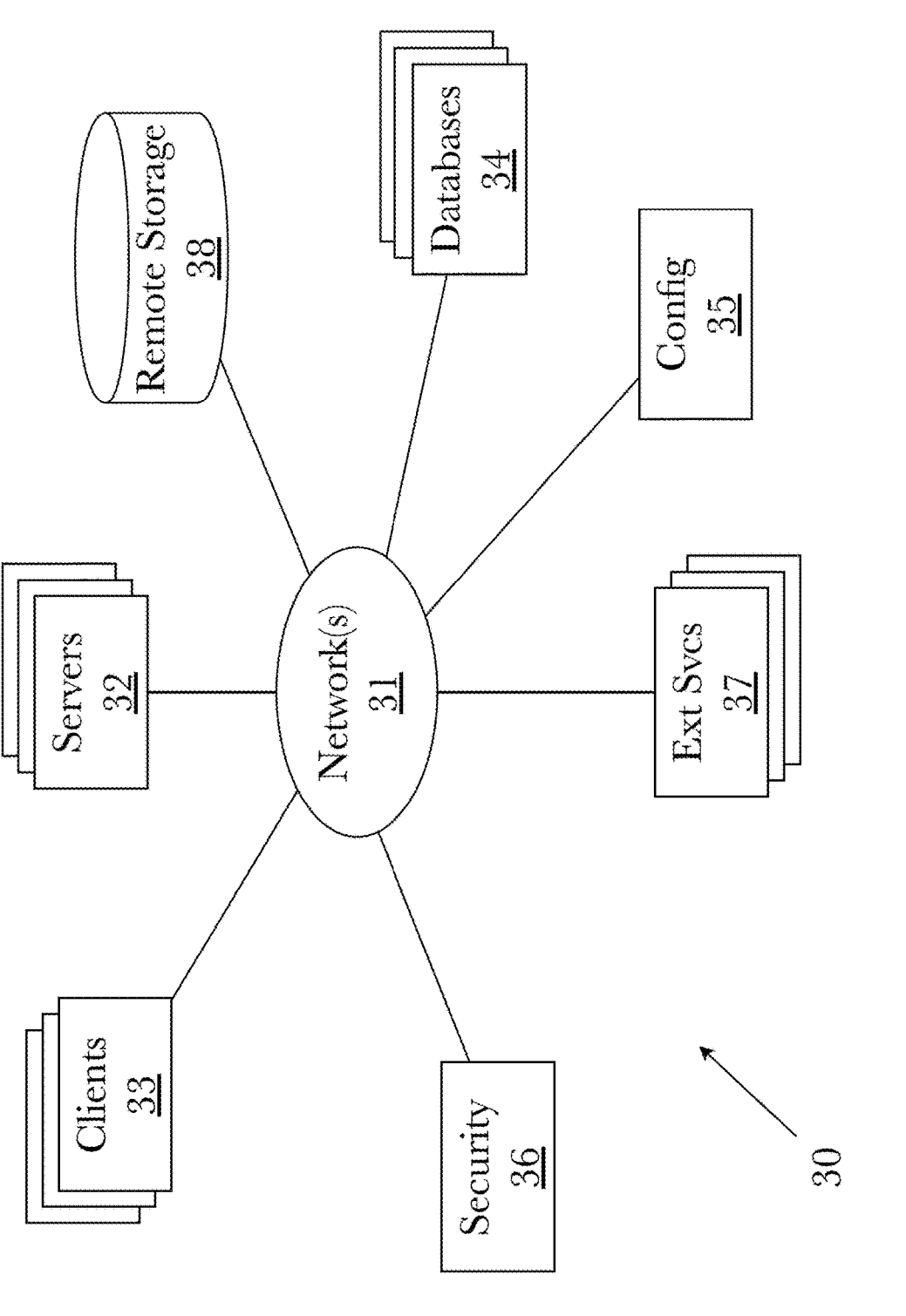
FIG. 22 is a block diagram showing an exemplary architectural arrangement of clients, servers, and external services.

In some embodiments, systems may be implemented on a distributed computing network, such as one having any number of clients and/or servers. Referring now to FIG. 22, there is shown a block diagram depicting an exemplary architecture 30 for implementing at least a portion of a system on a distributed computing network. According to the embodiment, any number of clients 33 may be provided. Each client 33 may run software for implementing client-side portions; clients may comprise a system 20 such as that illustrated in FIG. 21. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art. Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises. In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a SQL, while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific embodiment.

Figure 23:
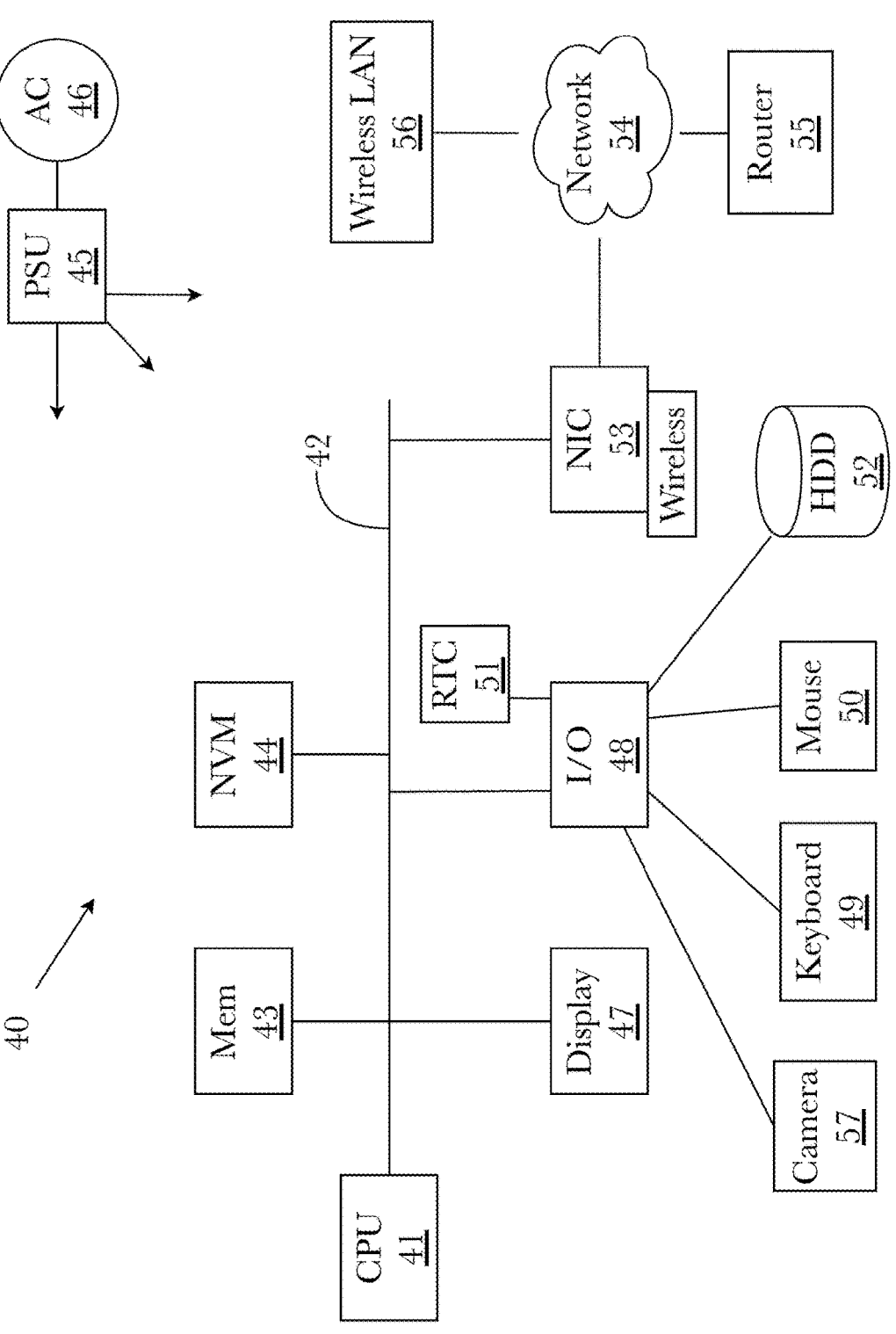
FIG. 23 is another block diagram illustrating an exemplary hardware architecture of a computing device.

FIG. 23 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods may be distributed among any number of client and/or server components. For example, various software modules may be implemented for performing various functions in connection with the various embodiments, and such modules may be variously implemented to run on server and/or client components.

According to a preferred embodiment, end users such as consumers can generate their own personal non-fungible tokens (PNFTs), and optionally associate them with their own image (such as a photo of the end user). These PNFTs are identified by a unique identifier, such as a globally unique identifier (GUID) that points to the location of the PNFT in a distributed ledger such as a blockchain. In some aspects a link or pointer to the image may be stored in the PNFT, while in others code such as that for smart contracts may be stored; as is known in the art with respect to non-fungible tokens, once a PNFT is saved on a distributed ledger it is immutable. A key aspect is that the PNFT is identified with a unique phone number (typically the number of the mobile phone from which the end user generated her PNFT). This is important because the user may, when desired, send a link (such as a URL) to another party (such as a business or another end user). The link may comprise metadata that may specify a bundle of rights or actions that the recipient is authorized to enjoy or to take. For example, the end user may use an application or a website to create a link that is tied to her PNFT and that authorizes the recipient to download a copy of the end user's resume from a specific location. On receipt of the link, and after clicking on it, the recipient may receive a message comprising a pre-drafted text message and a "Send" button; upon pressing Send, the text message is sent to the phone number associated with the PNFT of the end user who sent the link. At no time does the recipient have any knowledge of the phone number used; this is maintained by the platform that generated the PNFT at the request of the end user. When the end user receives the text message, for example saying "Company X has received a link to your PNFT and requests to download your resume;

do you approve?" she may either approve the request (if she sent the link) or not (if she didn't). In this way, a unique identifier that can be transmitted with metadata to any desired recipient and that is guaranteed to be associated with only a single person is used.

In order to generate a PNFT, according to an embodiment, an end user-using either a web page or an application connected to a token-granting server-requests that a personal non-fungible token be generated and optionally uploads an image or other data element to be stored permanently in association with the generated token. The requesting end user also provides her mobile phone number. On receipt of the request, and after any additional authentication or verification steps are taken, adds a record to a pending block based on the image or data received, and sends a text message to the end user at the mobile phone number provided. The requesting end user receives the text message and affirms that she sent the request, by clicking on a link in the text message (or otherwise indicating her assent, such as by an email confirmation). Once confirmed, the new record is permanently written to a distributed ledger, and the requesting end user receives the unique identifier of the newly-generated PNFT. At this point, the end user is able to post the PNFT on any suitable electronic medium, for example her webpage or a social network home page, or even embedded in her standard email template. It will be appreciated by one having ordinary skill in the art that "posting" an PNFT means placing an image (such as the personal photo image that was optionally uploaded when generating the PNFT) along with a (hidden) link "behind" the image or accessible via scanning the image. For example, a quick response (QR) code could be placed on a page or email that, when scanned by a QR-capable scanner, returns a clickable link with metadata. In many cases, the posting of an image representing a link is referred to as "posting the PNFT;" when a viewer of the page or application or social media page hosting the posted PNFT is viewed by a third party, the third party may click on the PNFT to activate the link. In some embodiments, such "clicking on the PNFT" by a third party causes a text message to be created (based on the PNFT and any associated metadata), which the third party may then send (without seeing the phone number to which it is sent; it is sent from the interaction manager or the media translation manager as described above). The owner of the PNFT will then receive a text message requesting that the third party be authorized to carry out whatever action is indicated (generally, this action—whether downloading a file, activating a smart contract, or obtaining access to specific elements of the PNFT owner's private data—is described in the metadata associated with the link or in a smart contract stored in the distributed ledger as part of the PNFT).

In some aspects, the party clicking on a first PNFT may themselves possess a second PNFT or other identifying information, so that the owner of the first PNFT will receive an authorization request identifying and attesting to the authenticity of the identity of the requesting party. In some aspects, a plurality of third parties may be specifically pre-authorized by an owner of a PNFT to take any actions associated with a specific link associated with the PNFT without the transmission of any authorizing text message; in some cases, pre-authorization of such parties just prior to clicking on a PNFT may be done by using the same text message authorization capability to confirm the identity of the requesting party before the request is made (biometric data may also be used in this way).

The systems described herein also may comprises a personal non-fungible token (PNFT) generator server. This server receives the request for a PNFT from end users as described above. The PNFT generator server, on receipt of such a request, either directly sends a text message to the mobile phone number given withy the request or instructs the interaction manager or media translation manager to send the text message. Upon receipt of a text message from the same phone number, confirming the request for a new PNFT, the PNFT generator server then determines a new unique identifier and sends the identifier via text message to the requesting user. In some embodiments the server may also send the PNFT identifier via email if requested and authorized. The PNFT generation server also writes the new token to the current block of a digital ledger or other immutable data store, such that it can be accessed using the unique identifier. It will be appreciated by one having ordinary skill in the art that this method of generating personal non-fungible tokens in effect creates a permanent association between a human person (and possibly their image), their mobile phone number, and the unique identifier of their newly-created personal non-fungible token. This allows the owner of a PNFT to post or send the PNFT with varying permissions or data payloads, and so to control their privacy and identity in a decentralized and secure way.

The skilled person will be aware of a range of possible modifications of the various embodiments described above. Accordingly, the present invention is defined by the claims and their equivalents.

What is claimed is:

1. A system for secure interactions for digital petition management, comprising:
   a computing device comprising a memory, a processor, and a non-volatile data storage device;
   a database on the non-volatile data storage device for personal unique tokens (PUTs), listing identifiers for PUTs recorded on a secure ledger;
   a server with instructions that, when executed by the processor, cause the processor to:
      place or embed a call to action associated with a digital petition on any Internet platform or communication message, where the call to action includes a clickable element that generates and sends a pre-filled message to a mobile device, with the message containing an identifier for the call to action;
      ensure the pre-filled message is ready for transmission from the mobile device via any messaging service;
   a media server with instructions that, when executed by the processor, cause the processor to:
      receive the pre-filled message from the mobile device;
      capture the mobile device's identifier from the message;
      send a request for a digital signature to the mobile device, linked to the pre-filled message;
      receive a message comprising the digital signature and metadata from the mobile device;
      send the digital signature and metadata to a petition manager; and
   a petition manager with instructions to:
      receive the mobile device's identifier, digital signature, and metadata, wherein the digital signature includes a PUT identifier linked to a user of the mobile device;
      create a timestamp using the metadata indicating when the digital signature was received;

verify the individual associated with the digital signature by matching the identifier with a stored database, and by verifying the PUT identifier against the secure ledger; and
      store the verified digital signature and the metadata in a secure storage system.

2. The system of claim 1, wherein the digital signature comprises a private key linked to a user of the mobile device and is verified using a corresponding public key in the stored database.

3. The system of claim 1, wherein the secure storage system is a blockchain ledger.

4. The system of claim 1, wherein the metadata includes any relevant contextual information such as geolocation, time, and date information.

5. The system of claim 1, wherein the digital petition is intended for any administrative, organizational, or regulatory application.

6. The system of claim 1, wherein the petition manager sends a completed digital petition to a specified endpoint.

7. A method for secure interactions for digital petition management, comprising the steps of:
   maintaining a database on a non-volatile data storage device for personal unique tokens (PUTs), listing identifiers for PUTs recorded on a secure ledger;
   placing or embedding a call to action associated with a digital petition on any Internet platform or communication message, where the call to action includes a clickable element that generates and sends a pre-filled message to a mobile device, with the message containing an identifier for the call to action;
   ensuring the pre-filled message is ready for transmission from the mobile device via any messaging service;
   receiving the pre-filled message from the mobile device;
   capturing the mobile device's identifier from the message;
   sending a request for a digital signature to the mobile device, linked to the pre-filled message;
   receiving a message comprising the digital signature and metadata from the mobile device, wherein the digital signature includes a PUT identifier linked to a user of the mobile device;
   sending the digital signature and metadata to a petition manager;
   receiving the mobile device's identifier, digital signature, and metadata;
   creating a timestamp using the metadata indicating when the digital signature was received;
   verifying the individual associated with the digital signature by matching the identifier with a stored database and by verifying the PUT identifier against the secure ledger; and
   storing the verified digital signature and the metadata in a secure storage system.

8. The method of claim 7, wherein the digital signature comprises a private key linked to a user of the mobile device and is verified using a corresponding public key in the stored database.

9. The method of claim 7, wherein the secure storage system is a blockchain ledger.

10. The method of claim 7, wherein the metadata includes any relevant contextual information such as geolocation, time, and date information.

11. The method of claim 7, wherein the digital petition is intended for any administrative, organizational, or regulatory application.

12. The method of claim 7, wherein the petition manager sends a completed digital petition to a specified endpoint.

13. One or more non-transitory computer-storage media having computer-executable instructions embodied thereon that, when executed by one or more processors of a computing system employing a system for secure interactions for digital petition management, cause the computing system to perform the method of claim 7.

14. The media of claim 13, wherein the digital signature comprises a private key linked to a user of the mobile device and is verified using a corresponding public key in the stored database.

15. The media of claim 13, including a database on the non-volatile storage for personal unique tokens (PUTs), listing identifiers for PUTs recorded on a secure ledger.

16. The media of claim 15, wherein the digital signature includes a PUT identifier linked to a user of the mobile device, and the petition manager verifies the PUT identifier against the secure ledger.

17. The media of claim 13, wherein the secure storage system is a blockchain ledger.

18. The media of claim 13, wherein the metadata includes any relevant contextual information such as geolocation, time, and date information.

19. The media of claim 13, wherein the digital petition is intended for any administrative, organizational, or regulatory application.

20. The media of claim 13, wherein the petition manager sends a completed digital petition to a specified endpoint.

* * * * *